(12) United States Patent
Jang et al.

(10) Patent No.: US 9,734,402 B2
(45) Date of Patent: Aug. 15, 2017

(54) EYEWEAR-TYPE TERMINAL AND METHOD OF CONTROLLING THE SAME

(71) Applicant: LG ELECTRONICS INC., Seoul (KR)

(72) Inventors: Yujune Jang, Seoul (KR); Taeseong Kim, Seoul (KR); Jeongyoon Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/601,984

(22) Filed: Jan. 21, 2015

(65) Prior Publication Data

US 2015/0324645 A1    Nov. 12, 2015

(30) Foreign Application Priority Data

May 12, 2014  (KR) ........................ 10-2014-0056720

(51) Int. Cl.
- *G06K 9/00* (2006.01)
- *G02B 27/00* (2006.01)
- *G02B 27/01* (2006.01)
- *G06F 3/01* (2006.01)

(Continued)

(52) U.S. Cl.
CPC ..... *G06K 9/00671* (2013.01); *G02B 27/0093* (2013.01); *G02B 27/017* (2013.01); *G06F 3/012* (2013.01); *G06F 3/013* (2013.01); *G06F 3/015* (2013.01); *G06F 3/017* (2013.01); *G06T 19/006* (2013.01); *H04N 5/23216* (2013.01);

(Continued)

(58) Field of Classification Search
CPC ............ G06K 9/00671; G02B 27/0093; G02B 27/017; G06F 3/017; G06F 3/012; G06F 3/013; G06F 3/015; G06T 19/006; H04N 5/23216

See application file for complete search history.

(56) References Cited

U.S. PATENT DOCUMENTS

2002/0044152 A1   4/2002  Abbott et al.
2009/0251333 A1*  10/2009  Itani ....................... G01C 21/36
                                                       340/932.2

(Continued)

FOREIGN PATENT DOCUMENTS

DE   10-2009-037835   2/2011
EP   1637975          3/2006

OTHER PUBLICATIONS

European Patent Office Application Serial No. 15153245.4, Search Report dated Oct. 19, 2015, 8 pages.

*Primary Examiner* — King Poon
*Assistant Examiner* — Vincent Peren
(74) *Attorney, Agent, or Firm* — Lee, Hong, Degerman, Kang & Waimey

(57) ABSTRACT

Provided is an eyewear-type terminal including a display unit on which picture information is displayed; a sensing unit that senses a period of time for which a user's gaze has been fixed in a state where a user wears the eyewear-type terminal; and a controller that collects information relating to something that the user gazes toward, in a case where the user's gaze has been fixed for a period of reference time or longer, and controls the display unit in such a manner that, among the pieces of collected information, at least one piece of collected information, is displayed on the display unit.

14 Claims, 18 Drawing Sheets

(51) Int. Cl.
  *G06T 19/00* (2011.01)
  *H04N 5/232* (2006.01)
(52) U.S. Cl.
  CPC ............ *G02B 2027/0178* (2013.01); *G02B 2027/0198* (2013.01); *G06F 2200/1636* (2013.01)

(56) References Cited

U.S. PATENT DOCUMENTS

| | | | |
|---|---|---|---|
| 2010/0191459 A1* | 7/2010 | Carter | G01C 21/32 701/532 |
| 2012/0075168 A1* | 3/2012 | Osterhout | G02B 27/017 345/8 |
| 2012/0235900 A1 | 9/2012 | Border et al. | |
| 2013/0050258 A1* | 2/2013 | Liu | G06F 17/3087 345/633 |
| 2014/0232570 A1* | 8/2014 | Skinder | G01C 21/165 340/989 |

* cited by examiner

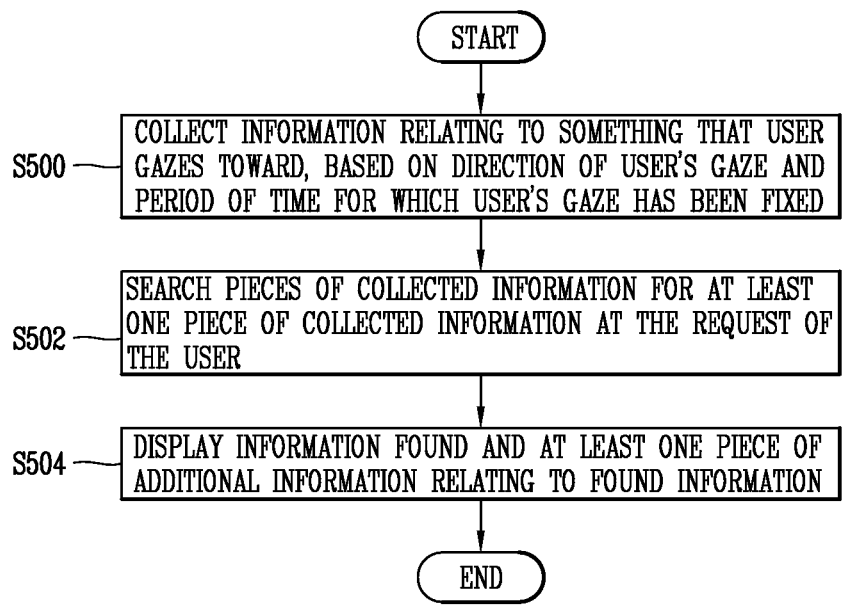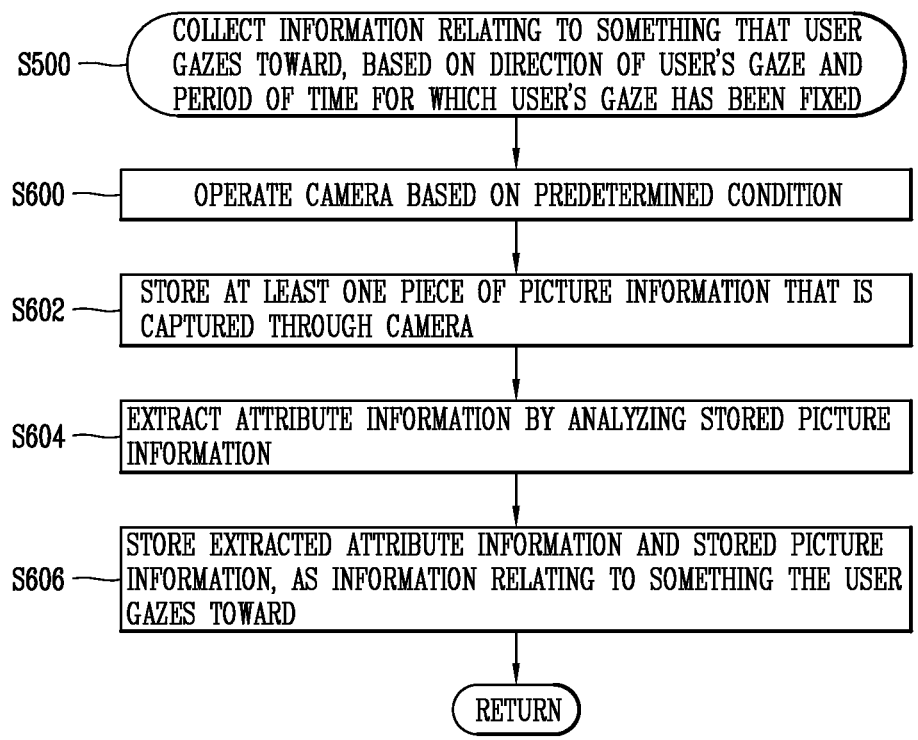

| SEARCH | |
|---|---|
| ADD. : | Edan street 427-32 |
| NAME : | Mr. PIZZA |
| MENU : | HOT PIZZA, SPAGETTI,... |
| PRICE : | $10 ~ $20 |
| IMAGE : | mr_pizza.jpg |

FIG. 13A(a)  FIG. 13A(b)
 
FIG. 13A(c)  FIG. 13A(d)
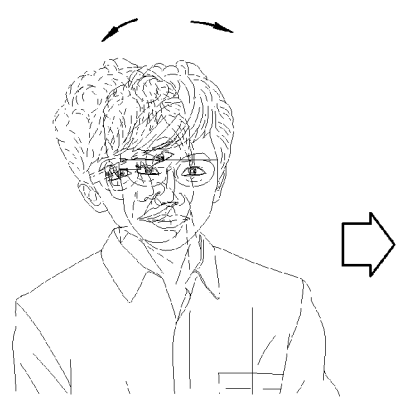 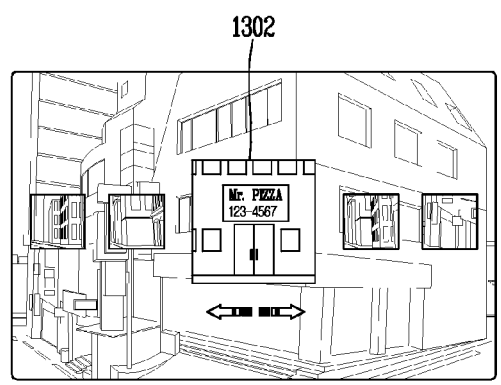
FIG. 13A(e)  FIG. 13A(f)
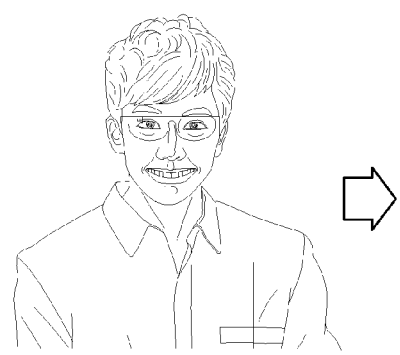 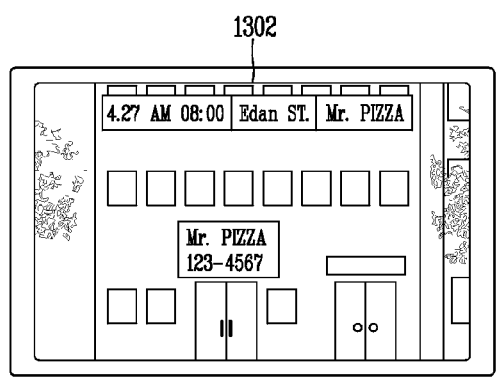

EYEWEAR-TYPE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Patent Application No. 10-2014-0056720, filed on May 12, 2014, the contents of which are hereby incorporated by reference herein in its entirety.

BACKGROUND OF THE DISCLOSURE

1. Field of the Disclosure

The present disclosure relates to an eyewear-type terminal and a method of controlling the eyewear-type terminal.

2. Background of the Disclosure

With the technical advances in the information age, particular emphasis is made on the importance of a display device realizing a reality-enhanced screen. A head-mounted display is one example of such devices.

The head-mounted display, mainly in the form of safety glasses or a helmet, is a display device that has a small display optic in front of each eye. The head-mounted display has been developed to realize a virtual reality. Generally, a wearable glasses-type terminal has a small-sized liquid crystal display installed in close proximity to both eyes and has the capability of reflecting projected images. Currently, research has been ongoing towards developments of the wearable glasses-type terminals for use in a space development, a nuclear reactor, a military institution, and for use in a business and a computer game.

Thanks to these improvements, the wearable glasses-type terminals according to one embodiment have been on the market. The smart glasses, realized as the wearable device, conveniently executes functions that are executed in the existing glasses-type terminal.

The smart glasses include a function of communicating with an external apparatus. Various methods in which more various functions are executed or controlled using the smart glasses have been under development.

SUMMARY OF THE DISCLOSURE

Therefore, an aspect of the detailed description is to provide a glasses-type terminal capable of collecting information on the vicinity of a user in an easier manner and providing the user with collected information at any time, and a method of controlling the glasses-type terminal.

Another aspect of the detailed description is to provide a glasses-type terminal capable of collecting information relating to a path along which a user moves and providing the user with the collected information whenever necessary, thereby helping the user to move back along the path and a method of controlling the glasses-type terminal.

To achieve these and other advantages and in accordance with the purpose of this specification, as embodied and broadly described herein, there is provided a glasses-type terminal including: a display unit on which picture information is displayed; a sensing unit that senses a period of time for which a user's gaze has been fixed in a state where a user wears the glasses-type terminal; and a controller that collects information relating to something that the user gazes toward, in a case where the user's gaze has been fixed for a period of reference time or longer, and controls the display unit in such a manner that, among the pieces of collected information, at least one piece of collected information, is displayed on the display unit.

In the glasses-type terminal, the controller may store pieces of information on the time and location at which the information relating to something that the user gazes toward is collected, as pieces of attribute information corresponding to the collected information.

The glasses-type terminal may further include a text recognition unit that recognizes text information in the information relating to something that the user gazes toward, in which the controller may include a result of the recognition by the text recognition unit in the pieces of attribute information corresponding to the collected information.

In the glasses-type terminal, when any one piece of attribute information is selected from among the pieces of attribute information by the user, the controller may search the pieces of collected information for corresponding information based on the selected attribute information, or may orderly arrange pieces of information displayed on the display unit, based on the selected attribute information.

The glasses-type terminal may further include a camera that captures the picture information, in which the controller may collect at least the one piece of picture information that is captured by the camera, as the information relating to something to which the user gazes toward.

The glasses-type terminal may further include a location identify unit that identifies current location of the mobile terminal, in which the controller may collect the information relating to a place corresponding to a direction on which the user's gazes has been for a period of time or longer, in the vicinity of the sensed current location.

In the glasses-type terminal, the controller may further collect information on a path along which the user moves, and, at the request of the user, may display the information relating to something that the user gazes toward, on the display unit, in such a manner that the information is positioned in the vicinity of the path displayed on the display unit.

The glasses-type terminal may further include a second sensing unit that senses at least one, among multiple taps that are applied to a main body of the glasses-type terminal, and a predetermined gesture that is made by the user, and an electromyogram change in facial muscles of the user, in which the controller may recognize the request of the user, based on a result of the sensing.

In the glasses-type terminal, based on a result of the sensing by the second sensing unit, the controller may begin to collect the information relating to something that the user gazes toward or may stop collecting the information relating to something that the user gazes toward.

In the glasses-type terminal, in a case where the collecting of the information begins or stops, the controller may display at least one predetermined graphic object on the display unit.

The glasses-type terminal may further include a location identify unit that identifies current location of the mobile terminal, wherein when any one piece of the collected information relating to something that the user gazes toward is selected from among the pieces of collected location information, the controller may perform control in such a manner that the current location and additional information relating to the selected one piece of collected location information are displayed on the display unit.

In the glasses-type terminal, the controller may collect the information relating to something that the user gazes toward, as parking information relating to location at which a predetermined vehicle is parked, and may display at least one pieces of collected parking information from among the pieces of collected parking information on the display unit, at the request of the user.

In the glasses-type terminal, the controller may determine whether or not the user gets off the predetermined vehicle, based on at least one, among a change in a moving speed of location of the user and a change in distance between location of the user and location of the predetermined vehicle, and may collect the information relating to something that the user gazes toward, as the parking information, based on a result of determining whether or not the user gets off the predetermined vehicle.

The glasses-type terminal may further include a camera that captures the picture information on the vicinity of location at which the predetermined vehicle is parked, in which when the picture information that is similar to at least one piece of parking information among the pieces of already-collected parking information, to a predetermined degree or higher, the controller may display the other pieces of parking information on the display unit in such a manner that the other pieces of parking information is positioned in the vicinity of the at least one piece of parking information displayed on the display unit.

In the glasses-type terminal, the camera may begin to operate or stop operating, based on at least one, among multiple taps that are applied to a main body of the glasses-type terminal, a predetermined gesture that is made by the user, and an electromyogram change in facial muscles of the user.

In the glasses-type terminal, the controller may further collect information on a path along which the user moves, and, at the request of the user, may display the information on the path on the display unit, along the parking information.

In the glasses-type terminal, the path along which the user moves may be displayed on the display unit, as a graphic object that uses augmented reality.

To achieve these and other advantages and in accordance with the purpose of this specification, as embodied and broadly described herein, there is provided a method of controlling a glasses-type terminal, the method including: sensing a period of time for which a user's gaze has been fixed in a state where a user wears the glasses-type terminal; collecting information relating to something that the user gazes toward, in a case where the user's gaze has been fixed for a period of reference time or longer; and controlling a display unit in such a manner that, among the pieces of collected information, at least one piece of collected information, is displayed on the display unit.

In the method, the sensing of the period of time for which the user's gaze is fixed may include sensing at least one among multiple taps that are applied to a main body of the glasses-type terminal and a predetermined gesture that is made by a user, and operating of a camera provided to the glasses-type terminal, based on a result of the sensing, in which the collecting of the information may be to store an image that is captured through the camera in operation, as at least one among a static image and a moving image.

In the method, the collecting of the information further may include performing text recognition on the collected information, generating a result of the text recognition as attribute information relating to the corresponding already-collected information, and categorizing the already-stored information based on the generated attribute information and storing a result of the categorizing.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 5 is a flowchart for describing a method of controlling the glasses-type mobile terminal according to one embodiment of the present invention;

FIG. 6 is a flowchart for describing an operation process of collecting information on something that a user gazes toward, among operational processes illustrated in FIG. 5;

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1:
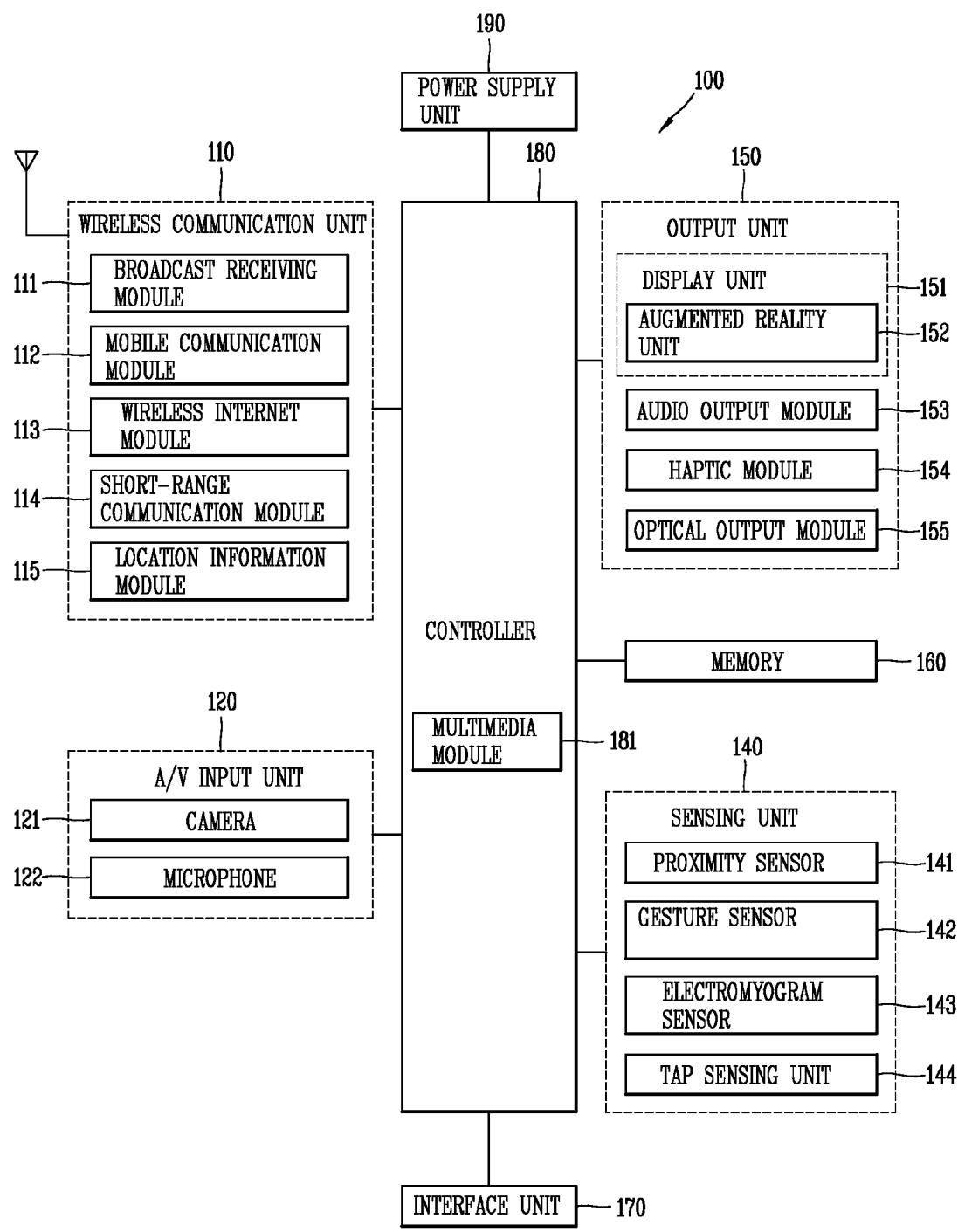
FIG. 1 is a diagram for describing a glasses-type terminal according to the present invention.

FIG. 1 is a block diagram of a mobile terminal in accordance with an embodiment of the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1 is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The sensing unit 140 may further include a gesture sensor 142 for sensing a user's preset gesture. For instance, the gesture sensor 142 may include a photo sensor, an acceleration sensor, an inertia sensor, a gravity sensor, etc., and may be configured to sense when a position of the mobile terminal 100 is changed by a user's gesture.

The sensing unit 140 may further include an electromyogram (EMG) sensor 143. The electromyogram indicates an electric signal generated when muscles are contracted.

The output unit 150 is typically configured to output various types of information, such as audio, video, tactile output, and the like. The output unit 150 is shown having a display unit 151, an audio output module 153, a haptic module 154, and an optical output module 155.

The display unit 151 may have an inter-layered structure or an integrated structure with a touch sensor in order to facilitate a touch screen. The touch screen may provide an output interface between the mobile terminal 100 and a user, as well as function as the user input unit which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit (not shown) is a component that permits input by a user. Such user input may enable the controller 180 to control operation of the mobile terminal 100. The user input unit may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In a case where the display unit 151 is configured as a glass-type, a head mounted display (HMD) or a transparent display, an image output to the display unit 151 may be displayed in an overlapped manner with a general view. In this case, the display unit 151 may further include an augmented reality (AR) output unit 152 configured to provide augmented reality (AR) for displaying a virtual image in an overlapped manner with a real image or background as a single image, using characteristics of such display.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 153 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 153 can provide audible output related to a particular function (e.g., a call signal reception sound, a message reception sound, etc.) performed by the mobile terminal 100. The audio output module 153 may also be implemented as a receiver, a speaker, a buzzer, or the like.

A haptic module 154 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 155 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 155 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

On the other hand, a sensing unit 140 of the mobile terminal 100 according to the present invention includes a tap sensing unit 144 that senses a tap or a tap gesture that the user applies to a main body.

At this point, the tap sensing unit 144 senses a gesture that is applied to a main body of the mobile terminal 100 or an object. More specifically, the tap is construed to mean an operation of hitting a tapping tool such as a finger lightly on a main body of the mobile terminal 100, or the object, or an operation of causing the tapping tool to come into contact lightly with the main body of the mobile terminal 100 or the object.

On the other hand, the tapping tool with the tap is applied is a thing with which an external force is applied to the main body of the mobile terminal 100, and the object, for example, such as a stylus pen, a pen, a point, or a fist. On the other hand, the tapping tool is not necessarily limited to the thing which a touch input is applied to the mobile terminal 100 according to the present invention, any type of thing with which an external force can be applied to the main body of the mobile terminal 100 or the object can be used as the tapping tool.

On the other hand, the object to which the tap gesture is applied is at least one among the main body of the mobile terminal 100 and an object on which the mobile terminal 100 is placed.

On the other hand, according to the present invention, the tap or the tap gesture is sensed by at least one among an acceleration sensor and a touch sensor that are included in the tap sensing unit 144. At this point, the acceleration sensor is a sensor capable of measuring dynamic forces, such as acceleration, vibration, and impact, which are applied to the main body of the mobile terminal 100.

That is, the acceleration sensor senses whether or not the tap is applied to the object, by sensing a movement (vibration) of the main body of the mobile terminal 100 that occurs due to the tap gesture. Therefore, the acceleration sensor senses the tap on the main body of the mobile terminal 100 or senses the tap on an object that is positioned so close to the main body of the mobile terminal 100 that the movement or the vibration of the main body of the mobile terminal 100 can be sensed.

In this manner, as long as the acceleration sensor can sense the movement or the vibration of the main body of the mobile terminal 100, the acceleration sensor can sense the tap that is applied not only to the main body of the mobile terminal 100, but also to an area other than the main body of the mobile terminal 100.

In the mobile terminal according to the present invention, in order to sense the tap on the main body of the mobile terminal 100, only one among the acceleration sensor and the touch sensor is used, the acceleration sensor and the touch sensor are sequentially used, or the acceleration sensor and the touch sensor are used at the same time. On the other hand, a mode in which only the acceleration sensor is used to sense the tap is referred to as a first mode, a mode in which the touch sensor is used to sense the tap is referred to as a second mode, and a mode in which the acceleration sensor and the touch sensor are all utilized (at the same time or sequentially) to sense the tap is referred to as a third mode or a hybrid mode.

On the other hand, in a case where the tap is sensed through the touch sensor, it is possible to more accurately recognize a position in which the tap is sensed.

On the other hand, in the mobile terminal 100 according to the present invention, in order to sense the tap through the acceleration sensor or the touch sensor, a display unit 151 of the mobile terminal 100 operates in a specific mode in which a minimum amount of current or electric power is consumed, even in an inactivated state. Such a specific mode is referred to as a "doze mode."

For example, a light-emitting element for outputting a screen to the display unit 151 is turned off and the touch sensor for sensing the tap on the display unit 151 is turned on in the dose mode, in the mobile terminal 100 that has a touch screen structure in which the touch sensor is combined into the display unit 151 in a layered manner. In addition, the dose mode may be a mode in which the display unit 151 is turned off and the acceleration sensor is turned on. In addition, the dose mode may be a mode in which the display unit 151 is turned off and the touch sensor and the acceleration sensor are both turned on.

Therefore, in the dose mode, that is, in a state where the lighting for the display unit 151 is turned off, or the display unit 151 is turned off (in a state where the display unit 151 is inactivated), in a case where the user applies the tap to at least one point on the display unit 151 or applies the tap to a specific point on the main body of the mobile terminal 100, at least one among the touch sensor or the acceleration sensor senses that the user applies the tap.

In addition, only in a case where at least two taps or more in secession are applied within a reference time, the tap sensing unit 144 determines that a "tap" for controlling the mobile terminal 100 is sensed. For example, in a case where with the tapping tool with which the external force can be applied to the display unit 151, the tap is applied one time to the display unit 151, the tap sensing unit 144 recognizes the one-time tap as the touch input. That is, in this case, a controller 180 controls a function (for example, a function of selecting an icon that is output to a point to which the touch input is applied) according to the touch input corresponding to the one-time tap, not a function corresponding to the one-time tap.

Therefore, only in a case where the tap sensing unit 144 senses that at least two taps or more (or multiple taps) in succession are applied within the reference time, the controller 180 determines that a "tap" for controlling at least one function or more is sensed, That is, the sensing of the tap means that at least two tap gesture or more in succession are sensed within the reference time. Therefore, the sensing of the "tap" hereinafter means that with an object such as a user's finger, or a touch pen, substantially the multiple taps are applied to the main body of the mobile terminal 100.

Furthermore, the controller 180 may determine not only whether or not the taps are sensed within the reference time, but also whether the taps that are applied with different fingers or the taps that are applied with one finger are sensed. For example, in a case where the taps are sensed as being applied to the display unit 151, the controller 180 determines whether the taps are applied with one finger or with different fingers, by recognizing fingerprints on a portion of the display unit 151 to which the taps are applied. In addition, the controller 180 recognizes a position on the display unit 151, in which the taps are sensed, or acceleration that is generated due to the taps, through at least one, among the touch sensor and the acceleration sensor that are provided in the tap sensing unit 144. Thus, the controller 410 determines whether the taps are applied with one finger or with different fingers.

Furthermore, the controller 180 considers additionally an angle at which the tap is applied and a distance between points to which the tap is applied or a direction in which the fingerprint is recognized, in order to determine whether the taps are applied with one finger, both hands or at least two fingers.

On the other hand, the sensing of the tap means that the multiple taps or knocks in succession are sensed within the reference time. At this point, the reference time is very short, and for example, is in a range of 300 ms to 2 s.

Accordingly, when the tap sensing unit 144 senses that the tap is applied to the main body of the mobile terminal 100 for the first time, the tap sensing unit 144 senses whether the tap is applied for the second time within the reference time after the tap is applied for the first time. Then, in a case where a next tap is sensed within the reference time, the tap sensing unit 144 or the controller 180 determines that a tap is sensed for controlling a specific function of the mobile terminal according to the embodiment of the present invention. In this manner, only in a case where a second tap is sensed within a predetermined period of time after a first tap is sensed, the controller 180 recognizes the first and second taps as "effective taps." Thus, the controller determines whether the user applies the tap in order to control the mobile terminal 100 or applies the tap by mistake.

In addition, there are various methods by which the controller 180 recognizes the taps as "effective taps." For example, when the second taps of which the number is a second reference number or greater are sensed as being applied to the main body of the mobile terminal 100 within a predetermined period of time after the first taps of which the number is a first reference number or greater are sensed as being applied, the controller 180 may recognize the first and second taps as "effective taps." At this point, the first reference number of times and the second reference number of times may be the same or be different. For example, the first reference number may be 1, and the second reference number may be 2. As another example, the first reference number and the second reference number may be all 1.

In addition, only in a case where the tap is applied to within a "predetermined region," the controller 180 determines that the "taps" are sensed. That is, when the tap is sensed as being applied to the main body of the mobile terminal 100 for the first time, the controller 180 calculates a predetermined region from a point at which the tap is sensed for the first time. Then, in a case where the taps of which the number is the first reference number or the second reference number, or the taps of which the number is equal to or greater than the first reference number or the second reference number are sensed as being applied to the "predetermined region" within the reference time after the tap is sensed for the first time, the controller 180 determines that the first tap or the second tap is applied.

On the other hand, of course, the reference time and the predetermined region may be changed in various ways according to the embodiment.

On the other hand, of course, the first tap and the second tap may be recognized as the taps that are independent of each other, not only according to the reference time and the predetermined region, but also according to a position in which each of the first and second taps is sensed. That is, if the second tap is sensed in a position that is a predetermined distance or above away from the position in which the first tap is sensed, the controller 180 determines that the first tap and the second tap are applied. Then, in a case where based on the position that is sensed in the manner, the first and the second tap are recognized, the first tap and the second tap may be sensed at the same time.

In addition, if the first tap and the second tap each are comprised of multiple touches, that is, if the tap is applied a number of times as the first tap and the second tap, of course, the multiple touches that make up each of the first tap and the second tap are sensed at the same time. For example, in a case where an initial touch that makes up the first tap is sensed and at the same time an initial touch that makes up the second tap is sensed in a position that is located a predetermined distance or above away from the position in which the initial touch that makes up the first tap is sensed, the controller 180 determines that the initial touch that makes up each of the first tap and the second tap is sensed. Then, the controller 180 determines that an additional touch input is sensed as being applied to each position. In a case where the touches of which the number is the first reference number or the second reference number are sensed in each position, the controller 180 determines that the first tap and the second tap are applied.

On the other hand, when the tap sensing unit 144 senses that the multiple taps are applied to the main body of the mobile terminal 100, the controller 180 controls at least one among functions that can be executed on the mobile terminal 100, based on the sensed multiple taps.

For example, in a case where application of the multiple taps satisfies a predetermined condition, the controller 180 controls at least one among the function that can be executed on the mobile terminal 100. As one example, the controller 180 may control different functions, depending on whether the user applies the multiple taps with only his/her one finger or hand, or with at least his/her two fingers or both hands. In addition, at least one among the functions that can be executed on the mobile terminal 100 may be controlled based on the multiple taps in a current operational state of the mobile terminal 100 and in a current environment of the mobile terminal 100.

At this point, the functions that can be executed on the mobile terminal 100 mean all types of functions that can be executed or be run on the mobile terminal 100. For example, one among the functions that can be executed may be a function of executing a program installed in the mobile terminal 100. For example, an expression "executing an arbitrary function" means that an arbitrary application is executed or be run on the mobile terminal 100.

As another example, the function that can be executed on the mobile terminal 100 may be a function necessary for basic driving of the mobile terminal 100. For example, as the function necessary for the basic function, there are a function of turning on and off a camera 121 or a microphone 122 provided in the display unit 151, a function of switching the mobile terminal 100 from an unlocked state to a locked state or from the locked state to the unlocked state, a function of providing setting on a communication network, a function of changing information on setting on the mobile terminal 100, and the like.

A recent glass-type mobile terminal is configured as a wearable device that is wearable on a human body, beyond the conventional technique of a user grasping the glass-type mobile terminal using his or her hand. An example of such wearable device is a smart watch, a smart glass, a head mounted display (HMD), etc. Hereinafter, a mobile terminal configured as the wearable device will be explained.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
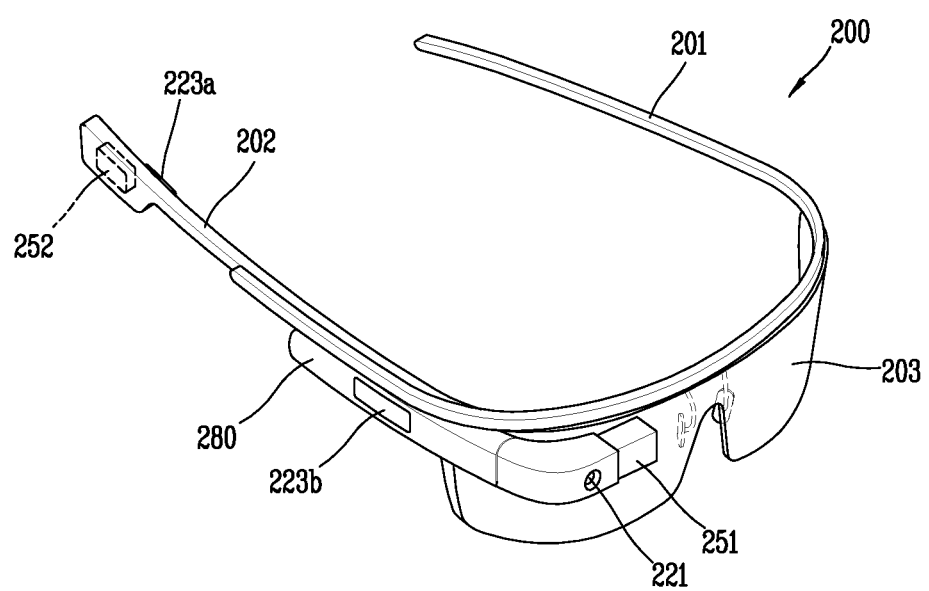
FIG. 2 is a diagram illustrating a wearable glasses-type terminal according to one embodiment of the present invention.

FIG. 2 is a perspective view illustrating one example of a glass-type mobile terminal 200 according to another exemplary embodiment.

The glass-type mobile terminal 200 can be wearable on a head of a human body and provided with a frame (case, housing, etc.) therefor. The frame may be made of a flexible material to be easily worn. The frame of mobile terminal 200 is shown having a first frame 201 and a second frame 202, which can be made of the same or different materials. In general, mobile terminal 200 may be configured to include features that are the same or similar to that of mobile terminal 100 of FIG. 1.

The frame may be supported on the head and defines a space for mounting various components. As illustrated, electronic components, such as a control module 280, an audio output module 252, and the like, may be mounted to the frame part. Also, a lens 203 for covering either or both of the left and right eyes may be detachably coupled to the frame part.

The control module 280 controls various electronic components disposed in the mobile terminal 200. The control module 280 may be understood as a component corresponding to the aforementioned controller 180. FIG. 2 illustrates that the control module 280 is installed in the frame part on one side of the head, but other locations are possible.

The display unit 251 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 200, the display unit 251 may be located to correspond to either or both of the left and right eyes. FIG. 2 illustrates that the display unit 251 is located on a portion corresponding to the right eye to output an image viewable by the user's right eye.

The display unit 251 may project an image into the user's eye using a prism. Also, the prism may be formed from optically transparent material such that the user can view both the projected image and a general visual field (a range that the user views through the eyes) in front of the user.

In such a manner, the image output through the display unit 251 may be viewed while overlapping with the general visual field. The mobile terminal 200 may provide an augmented reality (AR) by overlaying a virtual image on a realistic image or background using the display.

The camera 221 may be located adjacent to either or both of the left and right eyes to capture an image. Since the camera 221 is located adjacent to the eye, the camera 221 can acquire a scene that the user is currently viewing. The camera 221 may be positioned at most any location of the mobile terminal. In some embodiments, multiple cameras 221 may be utilized. Such multiple cameras 221 may be used to acquire a stereoscopic image.

The glass-type mobile terminal 200 may include user input units 223a and 223b, which can each be manipulated by the user to provide an input. The user input units 223a and 223b may employ techniques which permit input via a tactile input. Typical tactile inputs include a touch, push, or the like. The user input units 223a and 223b are shown operable in a pushing manner and a touching manner as they are located on the frame part and the control module 280, respectively.

If desired, mobile terminal 200 may include a microphone which processes input sound into electric audio data, and an audio output module 252 for outputting audio. The audio output module 252 may be configured to produce audio in a general audio output manner or an osteoconductive manner. When the audio output module 252 is implemented in the osteoconductive manner, the audio output module 252 may be closely adhered to the head when the user wears the mobile terminal 200 and vibrate the user's skull to transfer sounds.

A glasses-type mobile terminal is hereinafter referred to as a "glasses-type terminal" for convenience in description. For the description, the mobile terminal 100 according to the present invention is hereinafter assumed to be in the form of the glasses terminal.

A communication system which is operable with the variously described mobile terminals will now be described in more detail.

Figure 3:
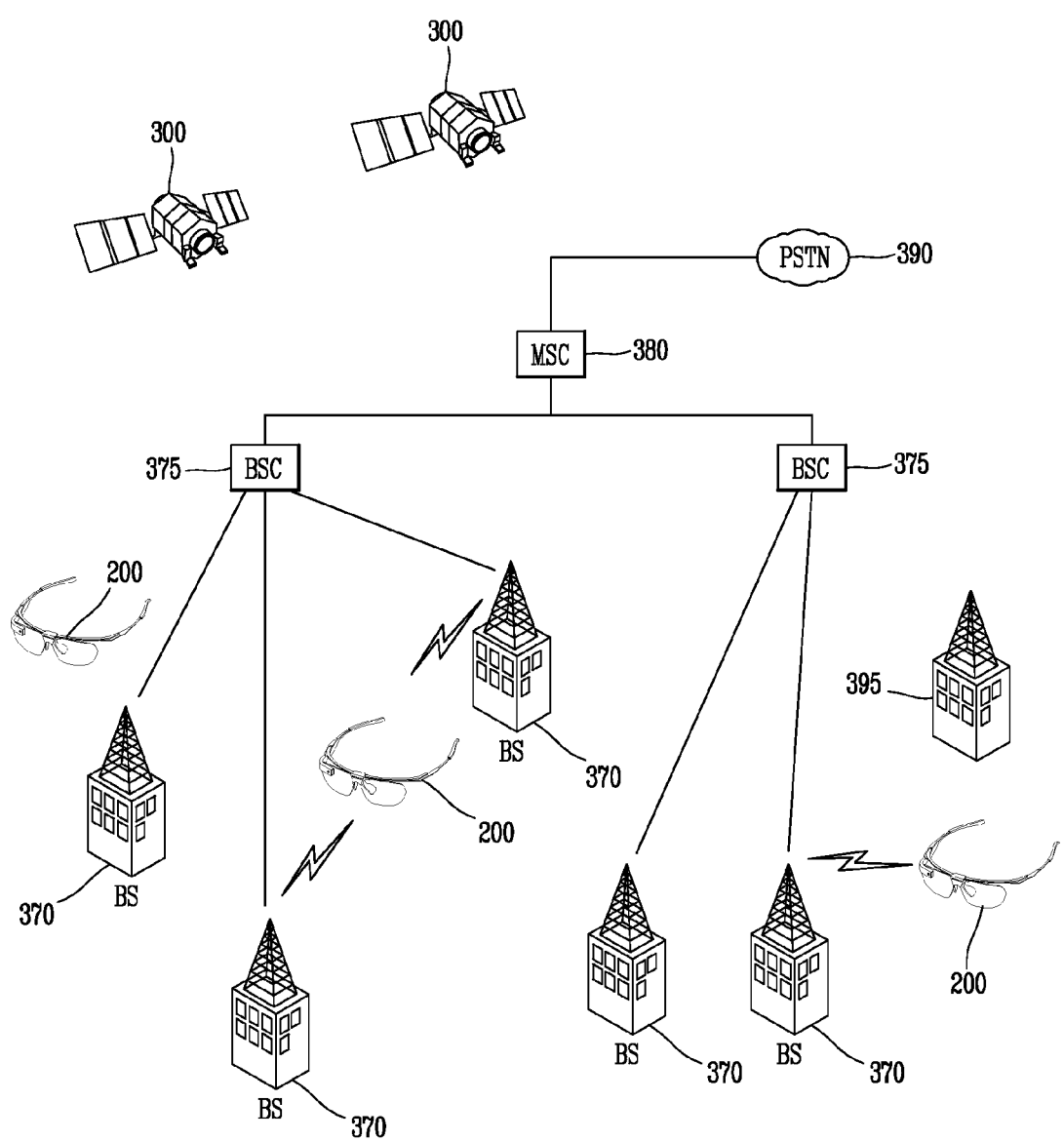
FIGS. 3 and 4 are diagrams of a communication system in which the glasses-type terminal can operate.
Figure 4:
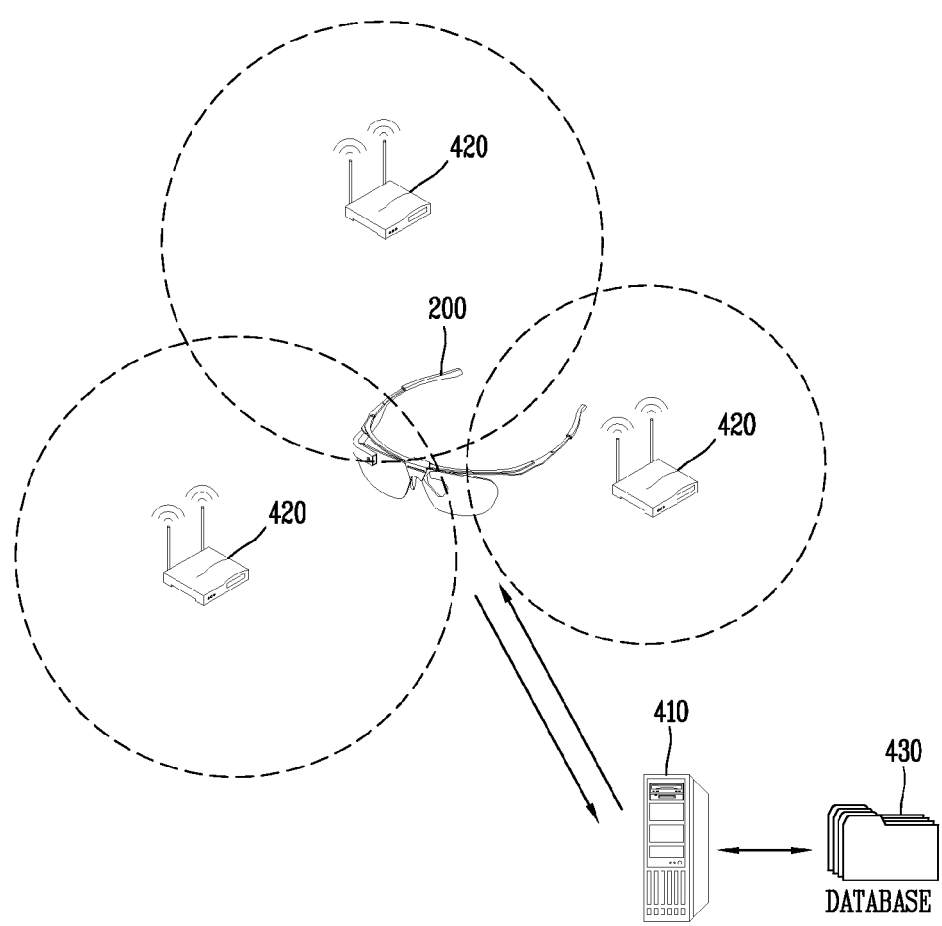

FIGS. 3 and 4 are diagrams of a communication system in which the glasses-type terminal 100 can operate.

Referring to FIG. 3, such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A(Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

As shown in FIG. 3, a CDMA wireless communication system generally includes one or more mobile terminals (MT or User Equipment, UE) 100, one or more base stations (BSs, NodeB, or evolved NodeB) 370, one or more base station controllers (BSCs) 375, and a mobile switching center (MSC) 380. The MSC 380 is configured to interface with a conventional Public Switched Telephone Network (PSTN) 390 and the BSCs 375. The BSCs 375 are coupled to the base stations 370 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 375 can be included in the CDMA wireless communication system.

Each base station 370 may include one or more sectors, each sector having an omni-directional antenna or an antenna pointed in a particular direction radially away from the base station 370. Alternatively, each sector may include two or more different antennas. Each base station 370 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 370 may also be referred to as Base Station Transceiver Subsystems (BTSs). In some cases, the term "base station" may be used to refer collectively to a BSC 375, and one or more base stations 370. The base stations may also be denoted as "cell sites." Alternatively, individual sectors of a given base station 370 may be referred to as cell sites.

As shown in FIG. 3, a broadcasting transmitter (BT) 395 transmits a broadcast signal to the mobile terminals 100 operating within the system. The broadcast receiving module 111 of FIG. 1 is typically configured inside the mobile terminal 100 to receive broadcast signals transmitted by the BT 395.

Referring to FIG. 3, global Positioning System (GPS) satellites 300 for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A method of positioning a glass-type mobile terminal using a WiFi positioning system will be explained with reference to FIG. 4.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point 420 for communicating with the Wi-Fi module.

The Wi-Fi positioning system may include a Wi-Fi location determination server 410, a glass-type mobile terminal 100, a wireless access point (AP) 420 connected to the glass-type mobile terminal 100, and a database 430 stored with wireless AP information.

The mobile terminal connected to the wireless AP may transmit a location information request message to the Wi-Fi location determination server 410. The Wi-Fi location determination server 410 extracts the information of the wireless AP 420 connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server 410 from the wireless AP 420.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server 410 may receive the information of the wireless AP 420 connected to the mobile terminal 100 as described above, and may extract (or analize) the location information of the mobile terminal 100 using the received information of the wireless AP 420 and the information included in the database. For example The Wi-Fi location determination server 410 may extract wireless AP information corresponding to the wireless AP connected to the mobile terminal from the pre-established database 430.

Referring to FIG. 4, the glass-type mobile terminal 100 can acquire location information by being connected to first to third wireless APs 420. The number of wireless APs required to acquire location information of the mobile terminal 100 may be variously changed according to a wireless communication environment within which the mobile terminal 100 is positioned. The glass-type mobile terminal 100 can acquire location information by being connected to at least one wireless AP.

The information of any wireless APs stored in the database 430 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

As described above, the database 430 included the information of any wireless APs and location information corresponded to the wireless APs, Therefore, the Wi-Fi location determination server 410 may search the information of the wireless AP 420 connected to the mobile terminal 100. And the Wi-Fi location determination server 410 may extract (analyze) location information of the mobile terminal 100 using at least one wireless AP information extracted from the database 430

In addition to these position location methods, various algorithms may be used to extract (analyze) location information of a mobile terminal. Such extracted location information may be transmitted to the mobile terminal 100 through the Wi-Fi location determination server 410, thereby acquiring location information of the mobile terminal 100.

FIG. 5 is a flowchart for describing a method of controlling the glasses-type mobile terminal according to one embodiment of the present invention.

Referring to FIG. 5, the controller 180 of the glasses-type terminal according to the present invention collects information relating to something that the user gazes toward, based on a direction of the user's gaze and on a period of time for which the user's gaze has been fixed (S500).

In Step S500, the controller 180 senses whether the user's gaze is fixed in one direction for a predetermined period of reference time or longer. For example, the controller 180 senses whether or not a direction that a glasses-type terminal 200 faces is changed, using an inertial sensor, a gravity sensor, compass sensor, or the like. Then, in a case where the direction toward which the glasses-type terminal 200 faces is not changed for a predetermined period of reference time or longer, the controller 180 determines that the user's gaze is fixed on a specific direction. Then, the controller 180 collects information relating to a place that is determined as corresponding to something that the user gazes toward.

At this point, various pieces of information may be collected. For example, the controller 180 stores an image that is received through a camera 22, as picture information, such as a moving image or a static image, and collects various pieces of information by analyzing the stored picture information.

For example, the controller 180 detects a recognizable portion of the static image or moving image, and stores a result of the detected portion in a text format. In addition, a result of the recognition may be categorized as attribute information relating to the pre-stored still image or moving image and a result of the categorizing may be stored. That is, in a case where a word "Tel" or a telephone symbol "☏" is recognized in the static image or moving image and a 7-digit or 9-digit number thereafter is recognized, the controller 180 recognizes the number as telephone information relating to the static image or moving image. In addition, the controller 180 may analyze a size of a text-recognizable image from the static image or moving image and may recognize a result of the text recognition as a firm name relating to a place corresponding to something that the user gazes toward, based on the analyzed size. In addition, of controller 180, the controller 180 may further collect not only text information, but also sound information, whenever necessary.

On the other hand, of course, the camera 221 may not need to maintain an always powered-on state. For example, in a case where the user's gaze being fixed satisfies a predetermined condition, that is, in a case where the user's gaze has been fixed for a period of reference time or longer, or based on user's selection, the controller 180 may determine an operational state of the camera 221 (a state where the camera is turns of or off).

At this point, the user can make a selection in various ways. For example, the controller 180 may operate the camera 221 in a case where a predetermined specific key (button) input is applied. Furthermore, the controller 180 may operate the camera 221, based on the multiple taps that are applied to a main body of the glasses-type terminal 200, that is, based on the number of times that tap is applied, or on a region to which the multiple taps are applied. Alternatively, in a case where the user makes a predetermined gesture (for example, such as when the user shakes his/her head a predetermined number of times back and forth), the controller 180 senses the gesture through the sensors of the sensing unit 140 and operates the camera 221.

Alternatively, the controller 180 may sense a very small amount of electric current that is sensed due to changes in user's facial muscles, through an electromyogram sensor or the like, and may operate the camera 221 according to a result of the sensing. In this case, it is determined whether or not the camera 221 is operated, based on changes in user's facial expression.

Then, in a case where the camera 221 is operated, of course, the controller 180 may indicate this such that the user can recognize that the camera 221 is in operation. For example, the controller 180 alerts the user that the camera 221 is in operation, through a predetermined sound signal such as a beep, a predetermined voice signal, or predetermined haptic vibration. Alternatively, the controller 180 alerts the user that the camera 221 is currently in operation and that information on the direction on which the user's gaze is fixed is collected, by displaying a predetermined graphic object on a display unit 251.

On the other hand, of course, pieces of information relating to something that the user gazes toward may be collected using methods other than the method of using the camera 221. For example, the controller 180 recognizes the direction that the glasses-type terminal 200 currently faces, using the gravity sensor, the compass sensor, and the like. Then, the controller 180 recognizes current location, and obtains information relating to a place corresponding to something that the user currently gazes toward, based on map information corresponding to the current location of the user and on the recognized direction that the glasses-type terminal 200 faces. Then, the controller 180 may further perform search for additional information relating to the obtained location information. In order to conduct the search, the controller 180 uses a software application that is stored in a memory 170 or a website that is connected through a wireless communication unit 110.

In this manner, the controller 180 obtains various pieces of information relating to a place corresponding to something that the user currently gazes toward. At this point, obtained pieces of information may include image information on the corresponding place and like, and may include a firm name or telephone information relating to a place corresponding to something that the user gazes toward, and the like. In addition, the controller 180 may further obtain various pieces of information such as evaluation opinions created by netizens.

Then, the controller 180 may categorize the pieces of information that are collected in this manner, according to their attributes, and may store a result of the categorizing. For example, the controller 180 categorizes the pieces of collected information according to the time and the place at which they are collected, and stores a result of the categorizing. Then, the controller 180 generates, as the pieces of attribute information, pieces of information that, like pieces of information on the time and the place at which the pieces of information are collected, serve as references against which the pieces of collected information are categorized.

Various pieces of information may be available as the attribute information. As described above, the pieces of information on the time or the place at which the pieces of information are available as the attribute information. Alternatively, pieces of information that are extracted from the pieces of collected information or are obtained by analyzing the pieces of collected information may be available as the attribute information. For example, in a case where picture information is collected, the controller 180 may preform text recognition on the collected information, and may generate at least one portion of a result of the text recognition as the attribute information. Alternatively, the controller 180 may generate the map information according to the current location of the user and at least one portion of a result of the search on a place corresponding to something that the user's gaze has been fixed for a period of reference time or longer, as the attribute information.

Accordingly, the controller 180 categorizes the pieces of collected information according to the time or the place at which they are collected, or the like. In a case where the user selects attribute information (for example, specific time, a specific place, a specific firm name, or the like), the controller 180 orderly arranges pieces of information relating to the same attribute information as the selected attribute information for display on the display unit 251.

On the other hand, the pieces of collected information are provided any time at the request of the user. For example, the user can make a request for providing the pieces of information that are collected, by inputting a voice, or by using various input devices, for example, such as a wearable smart watch (S502).

As one example, the controller 180 recognizes a voice signal that is received through the microphone 122, and searches the pieces of information, collected in Step S500, for information corresponding to the result of the recognition, among. At this point, of course, the microphone 122 may not need to be always operated, and may be operated according to the user's selection.

For example, in a case where a predetermined specific key (button) input is applied, the controller 180 operates the microphone 122. Alternatively, the controller 180 may operate the microphone 122 based on the multiple taps that are applied to the main body of the glasses-type terminal 200, that is, based on the number of times that tap is applied, or on the region to which the multiple taps are applied. Alternatively, in a case where the user makes a predetermined gesture (for example, such as when the user shakes his/her head a predetermined number of times back and forth), the controller 180 senses the gesture through the sensors of the sensing unit 140 and operates the microphone 122.

Alternatively, the controller 180 may sense a very small amount of electric current that is sensed due to changes in user's facial muscles, through the electromyogram sensor or the like, and may operate the microphone 122 according to a result of the sensing. In this case, it is determined whether or not the microphone 122 is operated, based on changes in user's facial expression.

In addition, in a case where the microphone 122 is operated, of course, the controller 180 may indicate this such that the user can recognize that the microphone 122 is in operation. For example, the controller 180 alerts the user that the microphone 122 is in operation, through a predetermined sound signal such as a beep, a predetermined voice signal, or predetermined haptic vibration. Alternatively, the controller 180 alerts the user that the microphone 122 is currently in operation and that the microphone 122 is ready to receive a voice signal from the user, by displaying a predetermined graphic object on the display unit 251.

Then, the controller 180, when requested to search the pieces of collected information, searches the pieces of collected information for at least one piece of information, using a keyword that is input by the user, that is, using information that is input as a voice signal or is input through a different device that can be connected to the glasses-type terminal 200.

For example, the user can directly input specifically-designated time such as "8 o'clock in the morning, today" or "between 8 o'clock and 9 o'clock in the morning, today." Alternatively, the user can directly input a name of a specifically-designated place, such as "Edan Street." In this case, based on keyword information that is input by the user, the controller 180 searches the pieces of collected information for pieces of information matched to the keyword.

On the other hand, as described above, the glasses-type terminal 200 according to the present invention recognizes its location through various methods (for example, GPS-based or WiFi-based radio determination, and the like). Using such methods, the controller 180 may recognize a path along which the user moves for specific periods of time, that is, a path from home to work or a path from work to home, and may categorize the pieces of collected information according to the recognized path, and may store a result of the categorizing.

In this case, when the user designates the recognized path and specific period of time, the controller 180 searches the pieces of information that have been collected along the recognized path for the designated periods of time. That is, for example, in a case where the user inputs key words such as "today, morning, Path to Work," as a voice signal, the controller 180 checks a current data, that is, a date of "today", and searches for a moving path corresponding to the "Path to Work," among the recognized paths, the pieces of information that had been collected for the time for which the user moved along the path ("Path to Work) on the checked date, that is, "today," and the like.

Then, the controller 180 orderly displays the pieces of information found on the display unit 251, responding to the inputting of the keywords by the user (S504). Based on a predetermined order of arrangement, the controller 180 orderly arranges the pieces of information found, in order for the user to select any one piece of information from among the pieces of orderly-arranged information. For example, the controller 180 may arrange the pieces of information found based on the period of time for which the user's gaze has been fixed, that is, a period of time for which the user has gazed toward something, or may orderly arrange the pieces of information found in chronological order from the first-stored information to the last-stored information or vice versa.

At this point, the user can select specific information using various methods. For example, the controller 180 can select specific information, using selection information that is available through a predetermined different device, for example, such as a smartwatch, or using a voice signal that is recognized through the microphone 122. In addition, in a case where the user makes a predetermined gesture, for example, a gesture in which the user turns his/her head in a specific direction or bends his/her head back in a specific information, the controller 180 may recognize such a gesture and may select specific information corresponding to the gesture. In addition, the controller 180 may select specific information, based on a result of sensing an electromyogram change in the user's facial muscles in accordance with a change in a user's facial expression.

Then, the information selected by the user is displayed, in a close-up state, on the display unit 251. Accordingly, the user can check information that is matched to the keyword that he/she inputs. On the other hand, the pieces of collected information are stored as items of data in formats that varies with their types, such as a static image, a moving image, text information, and voice information. The controller 180 enables the user to check information through a suitable application, based on types of the pieces of collected information.

On the other hand, at this point, of course, the pieces information that are matched to the keyword that is input by the user may include other pieces of information, as well as static image information. That is, as described above, the pieces of collected information may include not only static information, but also picture information such as a moving image, and various pieces of information may be collected by analyzing the picture information. Therefore, the controller 180 searches not only the picture information such as the static image or the moving image but also the pieces of information that are obtained as a result of analyzing the picture information or are obtained as a result of the search, for information that is matched to the keyword that is input by the user. Then, the controller 180 provides the user with the information found. Therefore, if the user inputs a name of a specific place and specific information as keywords, such as "today, Path to Work, 'Mr. PIZZA,' telephone number," of course, the controller 180 may provide the user with not only picture information, but also with telephone information corresponding to the keywords that are input.

On the other hand, the controller 180 may provide the user with not only information selected by the user, but also with various pieces of information. For example, the controller 180 provides information relating to current location of the user in addition to the pieces of information described above.

Alternatively, the controller 180 may search for many pieces of information based on at least one among the keywords that are input by the user, in order to providing the user with additional information.

As one example, in a case where the user inputs "today, morning, Path to Work, PIZZA" as keywords, the controller 180 recognizes four keywords, "today," "morning," "Path to Work," and "PIZZA," from the input from the user. Then, the controller 180 searches the pieces of collected information for information that is matched to the four keywords. Then, in a state where the information that is matched to the keywords is found, the controller 180 may provide additional information on at least one among the keywords, based on the user's selection.

Then, in a case where the user further selects "PIZZA" from among the keywords that are input, the controller 180 may further search the pieces of collected information for information corresponding to the keyword "PIZZA" that is selected by the user, and may display a result of the search on the display unit 251 along with the currently-pieces of information found. Alternatively, the controller 180 may recognize current location of the user, and may search a district around the current location of the user for a place corresponding to the selected keyword "PIZZA" and may display a result of the search on the display unit 251.

Furthermore, based on the user selection, the controller 180 may provide information relating to an area around a specific place as additional information.

For example, in a case where the user's gaze has been fixed for a period of reference time or longer in Step S500, the controller 180 collects information relating to a place corresponding to something that the user gazes toward and to an area around the place, by conducting a search, based on map information corresponding to current location of the user. Alternatively, in the case where the user's gaze has been fixed for a period of reference time or longer in Step S500, the controller 180 collects picture information for a predetermined period of time and extracts pieces of information relating to a place corresponding to something that the user gazes toward and an area around the place, from the pieces of information that have been collected for the predetermined period of time.

For example, the controller 180 performs the text recognition on the pieces of information that have been collected for the predetermined period of time in order to extract such pieces of information. Then, the controller 180 provides information obtained through the search or through the text recognition as addition information, based on the user selection.

On the other hand, as described above, the controller 180 may categorize the pieces of collected information according to their attributes, and may store a result of the categorizing. In this case, when any one piece of collected information is selected from among the pieces of collected information by the user, the controller 180 further displays associates of the currently-selected information on one region of the display unit 251, on which the selected information is displayed.

Then, the controller 180 performs control in such a manner that the user can select any one from among the associates of the currently-selected information based on a predetermined gesture or touch input, or on a voice input. In this case, the controller 180 may conduct a new search based on the selected associate and may provide the user with a result of conducting the new search.

On the other hand, FIG. 6 is a diagram for describing an operational process, among the operational processes illustrated in FIG. 5, that is performed in a case where picture information that is received through the camera is collected as information relating to a place corresponding to something that the user gazes toward. At this point, in a case where the glasses-type terminal 200 according to the embodiment of the present invention, of course, the camera may maintain a continually-operated state. However, when the camera 221 is operated in this manner, because unnecessary power is consumed, it is more preferable that the controller 180 should limitedly operate the camera 221.

Therefore, a case is described below where the camera 221 is limitedly operated in order to prevent unnecessary power consumption.

Referring to FIG. 6, the controller 180 of the glasses-type terminal 200 according to the present invention operates the camera 221 under a predetermined condition (S600). Then, in a case where in Step S600, the camera 221 is operated, the controller 180 stores at least one pieces of picture information that is input from the camera 221 (602).

At this point, the pieces of picture information may include not only a static image but also a moving image. Based on a current state of the user, or under a predetermined condition, the controller 180 stores an image that is received through the camera 221, in the format of either a static image or a moving image.

For example, the controller 180 senses a speed at which the location of the user is moved, and based on the moving speed of the location of the user, determines whether or not the image is collected in the format of a static image or in the format of a moving image. This is because in a case where a static image is stored in a state where a moving speed of the user is at a predetermined level or above, the static image is blurred due to the moving speed of the user. Therefore, in the case where the moving speed of the user is at a predetermined level or above, the controller 180 may collect the image in the format of a moving image that runs for a period of time. In a case where the moving speed of the user is at less than the predetermined level, the image may be collected in the format of a static image.

On the other hand, in a case where pieces of information are collected in the different forms in this manner, periods of time for which the pieces of information will be stored differ with one another. For example, because information that is stored in the format of a moving image has a larger size than information that is stored in the format of a static image, the period of time for which the information stored in the format of a moving image will be stored is relatively compared to the information stored in the format of a static image. In addition, in a case where an amount of data stored in the memory 170 is at a predetermined level or above, the information collected in the format of a moving image rather than that collected in the format of a static image may be preferentially deleted.

On the other hand, the camera that is used to collect information relating to a place corresponding to something that the user gazes toward, in the format of a static image or a moving image, is a camera that has a predetermined number of pixels or below. Alternatively, the camera or is a separate camera that stores images that are captured as a black and white image, that is, a black and white static image or a black and white moving image. In this case, the controller 180 collects information relating to a place corresponding to something that the user gazes toward, as low resolution picture information or white and black picture image, and thus minimizes an amount of data. In addition, instead of using a separate camera in this manner, when collecting information relating to a place corresponding to something that the use gazes toward, of course, the controller 180 may control the camera 221 in such a manner that image that are captured as images with a predetermined number of pixels or below or as black and white images are stored.

On the other hand, the predetermined condition in Step S600 for operating the camera 221 is that the user makes a predetermined gesture, is that the user applies a touch to a specific point on the glasses-type terminal 200, or is that the user applies the multiple taps to the main body of the glasses-type terminal 200. Alternatively, the predetermined condition may be satisfied based on an electromyogram change in the user's facial muscles. That is, in a case where the user consciously selects the operation of the camera 221, the controller 180 operates the camera 221 based on the user's selection. Then, based on whether or not a direction of the user's gaze has been fixed for a predetermined period of reference time or longer, the controller 180 stores images that are captured through a lens of the camera 221, as information on something that the user gazes toward.

Furthermore, when a specific condition is satisfied, the glasses-type terminal 200 according to the present invention may automatically operate the camera 221 to store picture information. For example, in a case where the predetermined condition is that the direction that the front side of the glasses-type terminal 200 faces is not changed for a predetermined period of reference time or longer, when the user's gaze has been fixed for the predetermined period of time, the controller 180 may operate the camera 221 and, at the same time, may store the image that is captured through the lens of the camera 221, as information on something that the user gazes toward.

In this case, the glasses-type terminal 200 according to the present invention automatically collects information relating to something that the user gazes toward. Accordingly, even though the user does not consciously begin to collect information, the glasses-type terminal 200 according to the present invention may collect the information based on a user's unconscious action and the like.

On the other hand, when, in Step S602, the picture information relating to something that the user gazes toward is stored, the controller 180 extracts various pieces of information relating to the stored picture image, as the attribute information (S604). For example, the controller 180 extracts information relating to the time and/or the place at which the picture information is collected, such as "today (4/27), Path to Work," as the attribute information.

In addition, of course, the controller 180 may extract a result of analyzing the stored picture information, as the attribute information. For example, the controller 180 detects a recognizable portion of the stored picture information, and perform the text recognition on the detected portion. Then, the controller 180 extracts the result of the recognition as the attribute information relating to the corresponding picture image.

For example, the controller 180 recognizes text, an image, and the like that are shown on a signboard of a specific restaurant, from the stored picture information. In this case, the controller 180 extracts a result of recognizing the text, the image, and the like, as information relating to the picture information on which the recognition is performed, that is, as the attribute information. As one example, in a case where the text such as "PIZZA Paradise" is recognized as a result of analyzing the picture information, the controller 180 recognizes from the recognized text that a food name "PIZZA" is included. In this case, the controller 180 extracts the attribute information "PIZZA" from the picture information that includes the text. Alternatively, in a case where as a result of the recognition, a word "Tel" or a telephone symbol "☎" is recognized and a multiple-digit number thereafter is recognized, the controller 180 extracts the number as attribute information relating to the moving image or the static image, that is, as "telephone number."

On the other hand, when the attribute information is extracted in Step S604, the controller 180 categorizes the stored picture information based on the extracted attribute information and stores a result of the categorizing (S606).

For example, in a case where the attribute information of the picture information that includes the text is "PIZZA," the controller 180 categorizes the picture information that includes the text, as a generic term, that is, as a "food," or a "restaurant," and stores a result of the categorizing. An example of the information that is collected in this manner is described in detail referring FIGS. 10A to 10C.

On the other hand, of course, information relating to current location of the user may be used in order to collect information relating to something the user gazes toward. For example, in a case where it is determined that the user begins to collect information, the controller 180 may recognize the current location, and may collect information relating to something on which the user's gaze has been fixed for a predetermined period of time or longer, using map information relating to the recognized current location and a current direction of the user's gaze.

Figure 7:
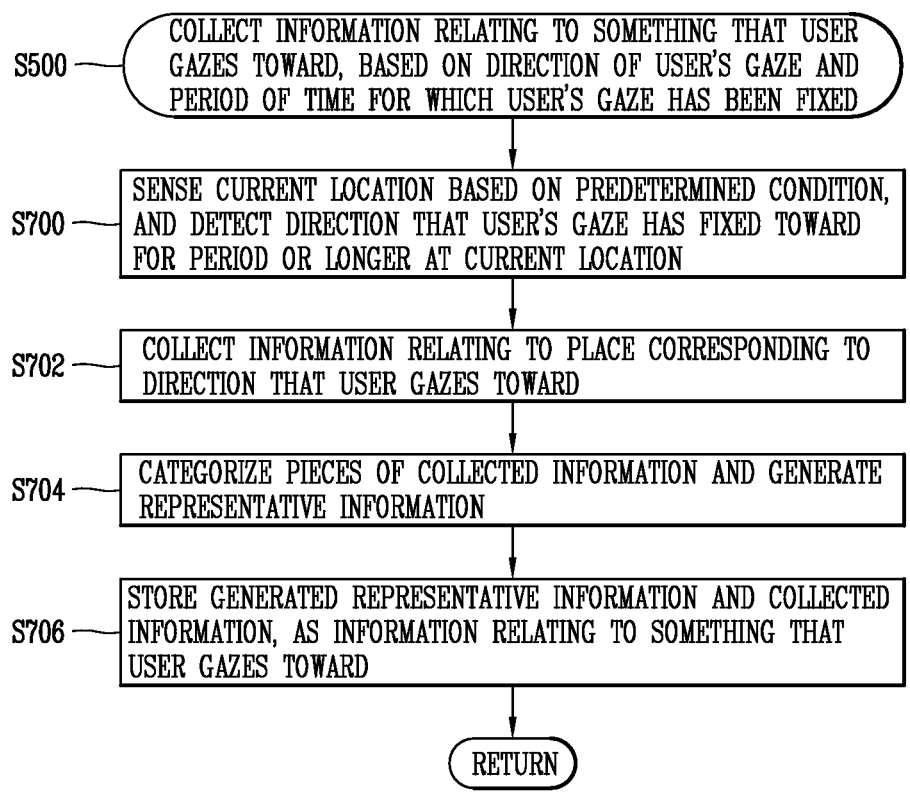
FIG. 7 is a flowchart for describing another example of the operational process of collecting the information on something that the user gazes toward, among the operational processes illustrated in FIG. 5.

FIG. 7 illustrates an operational process by the controller 180 of the glasses-type terminal 200 according to the embodiment of the present invention.

Referring to FIG. 7, the controller 180 senses the current location under a predetermined condition, and detects the direction on which the user's gaze has been fixed for a predetermined period of time or longer, with the sensed current location serving as a reference (S700).

At this point, the predetermined condition means a condition to begin to collect information. That is, for example, in a case where the user gazes in a specific direction without changing the direction of the gaze, the controller 180 determines that the predetermined condition is satisfied and detects the current location and the direction on which the user's gaze has been fixed for the predetermined period of time or longer. Alternatively, the predetermined condition may be that the user makes a predetermined gesture, be that the user applies a touch to a specific point on the glasses-type terminal 200, or be that the user applies the multiple taps to the main body of the glasses-type terminal 200. Alternatively, the predetermined condition may be satisfied based on an electromyogram change in the user's facial muscles.

On the other hand, in a case where the predetermined condition is satisfied, the controller 180 recognizes that information relating to something that the user gazes toward begins to be collected, and collects information relating to a place corresponding to a direction of the user's gaze (S702). For example, based on the map information corresponding to the currently-recognized location, the controller 180 detects a place located in the direction of the user's gaze and conducts a search on the detected place. For example, to conduct the search, the controller 180 uses a predetermined website and the like, in which case various pieces of information that are collected through the website are pieces of information relating to something that the user gazes toward.

For example, the pieces of information that are collected in Step S702 are various pieces of information. That is, the controller 180 collects information on which shop is located in the place corresponding to something that the user gazes toward or information on which business line the shop has, and collects pieces of information relating to a name and telephone number of the shop. In addition, if the user gazes toward a shopping center with multiple shops on each floor, the controller 180 may collect information on each of the multiple shops. Alternatively, the controller 180 may selectively collect only pieces of information on the shops on a specific floor, based on a distance between the current location of the user and the corresponding ship and on an angle at which the user gazes upward with respect with a horizontal line.

On the other hand, the controller 180 categorizes the pieces of information that are collected in this manner, and generates representative information (S704). For example, as a result of collecting the pieces of information, the controller 180 obtains not only pieces of information on the corresponding ship located in the corresponding place, such as a shop name, a business line, and a telephone number, but also pieces of information such as evaluation opinions created by netizens, as pieces of information on a place corresponding to something that the user gazes toward. The controller 180 categorizes the pieces of information that are obtained in this manner, according to their attributes, that is, a ship name (for example, "PIZZA Paradise"), a telephone number, and a business type (for example, "restaurant"), selects a representative information from among the pieces of collected information and stores the categorized pieces of information and the representative as pieces of information relating to something that the user gazes toward. At this point, the controller 180 generates information on the name of the shop as the representative information. Alternatively, in a case where image information on the corresponding ship is present in the pieces of collected information, the controller 180 may generate the image information as the representative information, or may generate the information on the name of the shop and the image information as the representative information.

Then, when the representative image is generated, the controller 180 stores the other pieces of collected information as the attribute information relating to the representative information (S706). For example, the controller 180 stores the collected telephone information and the business-type information as the attribute information relating to the generated representative information. Then, the controller 180 categorizes the representative information according to the attribute information. For example, in a case where the attribute information relating to the representative information is "restaurant," the representative information is categorized as "restaurant" and a result of the categorizing is stored.

On the other hand, the pieces of collected information may include not only information relating to the shop in a place corresponding to something that the user gazes toward, but only information on the time and/or place at which the information collected. In this case, the information on the time and/or the place at which the information is collected is also stored as the attribute information relating to the representative information. Then in Step S706, the representative information is used as a reference for the categorizing.

Figure 11A:
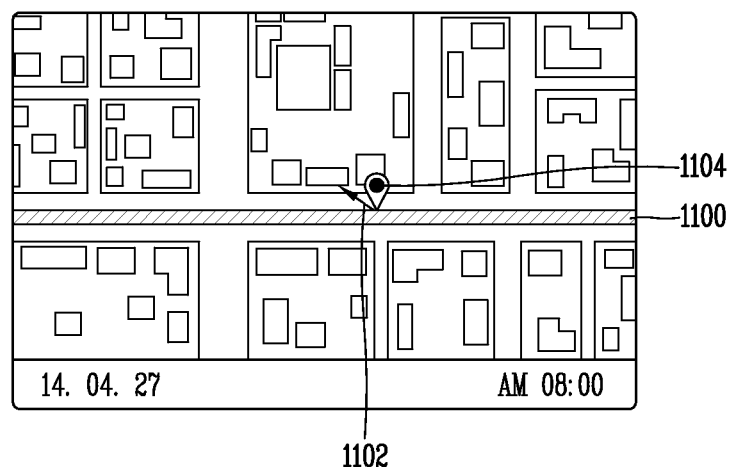
FIGS. 11A(a) and 11A(b) and 11B(a) and 11B(b) are diagrams illustrating examples of collecting the information relating to something that the user gazes toward in the glasses-type terminal according to the embodiment of the present invention.
Figure 11A:
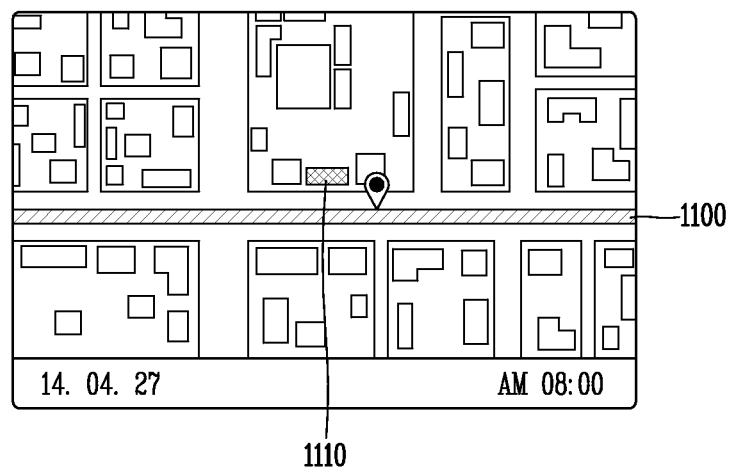

An example in which in this manner, the controller 180 collects information on a specific place based on the current location and the direction of the user's gaze is described in more detail referring to FIGS. 11A(a) and 11B and 11B(a) and 11B(b).

On the other hand, based on a change in a moving state of the user, the glasses-type terminal 200 according to the present invention sets an information collection method or categorizes the information that is collected, as specific information and stores a result of the categorizing. For example, as described above, in a case where the moving speed of the user is a predetermined speed or higher, the controller 180 collects information as a moving image instead of a static image and stored the collected information. Alternatively, based on the location of the user or on a change in the moving speed of the user, the controller 180 may determine whether or the user gets off a predetermined vehicle. Then, according to a result of the determination, the controller 180 may categorize the information is collected, as parking information and may store a result of the categorizing.

Figure 8:
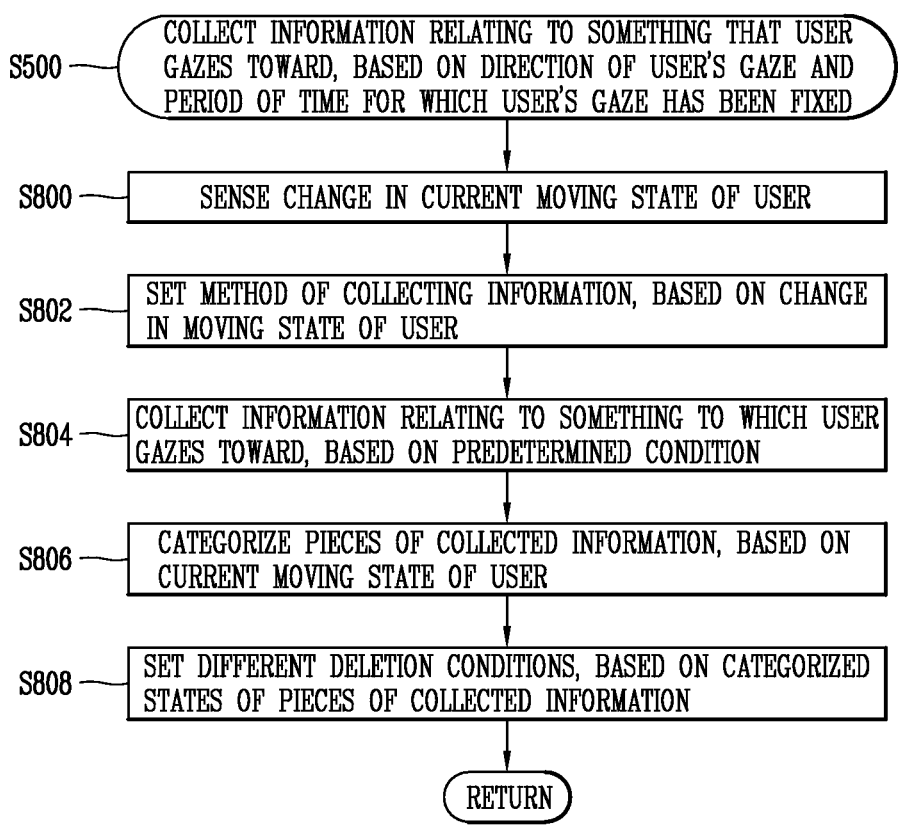
FIG. 8 is a flowchart for describing an operational process of categorizing and storing the collected information, among the operational processes illustrated in FIG. 5.

FIG. 8 illustrates an example of a process in which the glasses-type terminal 200 according to the embodiment of the present invention categorizes the collected information based on the change in the moving state of the user, and stores a result of the categorizing.

Referring to FIG. 8, the controller 180 of the glasses-type terminal 200 according to the present invention senses the change in the moving state of the user (S800). Based on a result of the sensing by the acceleration sensor or the inertial sensor or on whether or not as a result of recognizing the location of the user, the moving speed of the location of the user is at a predetermined level or above, the controller 180 determines whether the user is within or out of a vehicle. Alternatively, in a case of a predetermined vehicle, the controller 180 checks a change in a distance between the location of the user and the predetermined vehicle using a Near Field Communication (NFC) tag or a Radio Frequency (RF) chip that is mounted in the predetermined vehicle. Based on a result of the checking, of course, the controller 180 may determine whether the user gets on or get off the predetermined vehicle.

Based on the change in the moving state of the user or on the change in the location of the user, the controller 180 sets the information collection method (S802). For example, as described above, the controller 180 collects the information in the format of a moving image or a static image, based on the moving speed of the user. Alternatively, the controller 180 may collect the information that is to be collected, in a predetermined way (for example, in a way that collects the parking information), based on whether or not the user gets off a predetermined vehicle.

Furthermore, of course, the controller 180 may directly select a specific information collection method. For example, the user can select a specific information collection method by applying a predetermined gesture or multiple taps to the main body of the glasses-type terminal 200, or can select the specific information collection method using a different device that is connected to the glasses-type terminal 200, or using a voice signal.

Various information collection methods may be predetermined. For example, the predetermined information collection methods include a parking-information collection method. The parking-information collection method is one in which in a case where the user fixes his/her gaze in a specific direction for a period of reference time or longer, pieces of information on a path along which the user moves, that is, a moving direction and speed, and a distance that the user moves are further collected as well as static image information or moving image information that is obtained through the camera 221. The user sets such an information collection method in advance by selecting a type of information (for example, the picture information and information on the moving direction of the user, the moving speed of the user, and the distance that the user moves, in the case of collecting the parking-information) to be collected.

On the other hand, when in Step S802, an information collection method is set based on the change in the moving state of the user, the controller 180 collects information relating to something that the user gazes toward, based on a predetermined condition (S804). At this point, the predetermined condition is a condition for to begin to collect information.

That is, as described above, the predetermined condition is that the user fixes his/her gaze in a specific direction for a predetermined period of time or longer, is that the user makes a specific gesture (for example, a gesture in which the user shakes his/her head up and down or makes a specific facial expression), or is that the user applies a touch to a predetermined point on the glasses-type terminal 200. Alternatively, the predetermined condition may be one that predetermined multiple taps are applied to the main body of the main body of the glasses-type terminal 200.

When the predetermined condition is satisfied, in Step S802, the controller 180 collects information relating to something that the user gazes toward according to a predetermined information collection method. That is, in a case where the moving speed of the user is a predetermined speed or above, an information collection method uses the format of a moving image. Accordingly, in step S804, an image that is captured through the camera 221 is stored in the format of a moving image.

On the other hand, of course, the controller 180 may store not only the pieces of information that are collected in Step S804, but also pieces of information that are obtained by analyzing the pieces of collected information. For example, the controller 180 may perform the text or image recognition on the pieces of collected information, and may further store a result of the recognition as information relating to the pieces of collected information.

In addition, in a case where a currently-set information collection method is for collecting parking information, the controller 180 further collects information on a path along which the user moves, in addition to the information that is collected through the camera 221 and stores the collected information.

At this point, the information on the path along which the user moves is stored in predetermined units of time, and includes the moving direction of the user and the moving speed of the user. When the information on the moving path is collected, the controller 180 may associate the collected information with picture information that is collected through the camera 221, and may store a result of the associating. For example, when the picture information is collected, the controller 180 associates the information on the path along which the user moves, which is collected at the time corresponding to the time at which the picture information is collected, with the time at which the picture information is collected.

On the other hand, in Step S804 are categorized according to the moving state of the user and a result of the categorizing is stored (S806). Therefore, in a case where as a result of the determination in Step S800, the moving speed of the user is at a predetermined level or above, the controller 180 determine that the user within a vehicle, and collects information in the format of a moving image in Step 804. Then, in Steps S806, the pieces of information that are collected in the format of a moving image are categorized as pieces of information that are collected in a state where the user is within the vehicle and a result of the categorizing is stored. On the other hand, in a case where the user gets off the vehicle, the pieces of information that are collected in a similar manner to this are categorize and a result of the categorizing is stored. For example, in a case where it is determined in Step S800 that the user gets off the predetermined vehicle, the controller 180 collects the pieces of information as parking information in Step S804, and categorizes the pieces of collected information as the parking information and stores a result of the categorizing in Step S806.

Then, based on a result of the categorizing, the controller 180 may set different deletion conditions (S806). For example, the likelihood that the pieces of information that are collected while the user is in a vehicle will be those on a sphere of living for the user (for example, an area surrounding a user's dwelling or a user's workplace) is determined to be low. This is because the pieces of collected information are obtained while the vehicle is driving to a certain destination. In contrast, the likelihood that the pieces of information that are collected while the is out of the vehicle will be those on the sphere of living for the user is determined to be high. Thus, a period of time for which the pieces of information that have been collected while the user is not in the vehicle will be stored is set to be longer than that for which the pieces of information that are collected while the user is in the vehicle will be stored.

Alternatively, in a case where the pieces of collected information are pieces of parking information, the controller 180 may immediately delete the pieces of collected information, based on the location of the user or on the change in the moving speed. For example, of course, the controller 180 may determine that the user is again in the predetermined vehicle and may delete the parking information, in a case where it is sensed that the user is again in the predetermined vehicle (for example, in a case where the user is again positioned within a predetermined distance or below from an NFC tap or a RF chip mounted within the predetermined vehicle) or in a case where as a result of sensing the moving speed of the location of the user, the moving speed of the location of the user is at a predetermined level or above.

Figure 9:
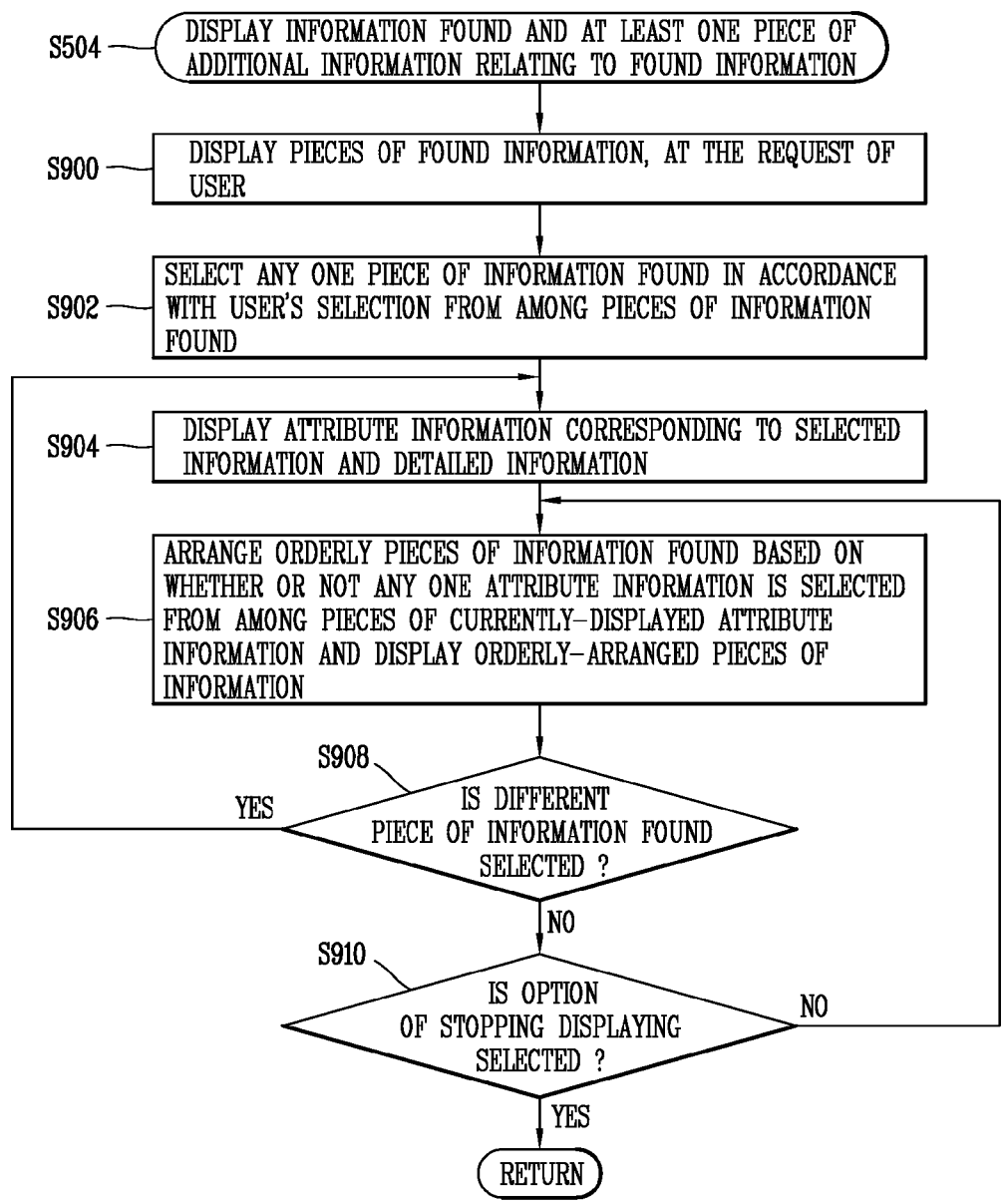
FIG. 9 is a flowchart for describing an operation process of displaying information found at the request of the user, among the operational processes illustrated in FIG. 5.

FIG. 9 illustrates an operational process of displaying the information found at the request of the user, among the operational processes in FIG. 5, Referring to FIG. 9, the controller 180 of the glasses-type terminal 200 according to the present invention displays the pieces of information found, among the pieces of already-collected information, on the display unit 251 at the request of the user (S900).

At this point, the user makes the request by inputting a voice signal into the microphone 122, or inputs the request through a different device that can be connected to the glasses-type terminal 200 according to the embodiment of the present invention. In a case where multiple taps are applied to the main body of the main body of the glasses-type terminal 200 or it is determined that a predetermined gesture is sensed, or in case where a touch input is applied to a specific point on the glasses-type terminal 200, the controller 180 operates the microphone 122 or the different device that can be connected to the glasses-type terminal 200 to receive the request of the user.

For example, when it is assumed that the user make the request for the collected information using the voice signal, the user inputs keywords for pieces of information that he/she wants to search for, using his/her voice. Then, the controller 180 searches the pieces of collected information for information corresponding to the keyword that is input. At this point, the pieces of information that are matched to the keyword are various pieces of attribute information relating to the pieces of collected information. That is, the information (for example, the attribute information) relating to the time or the place at which the information is collected is information that is matched to the keyword. Therefore, in a case where the user inputs a keyword such as specific time (for example, "today, morning, Path to Work") or a specific place (for example, "Edan Street") into the microphone 122, the controller 180 searches the pieces of already-collected information for pieces of information that are matched to the keyword that is input, and displays the pieces of information found on the display unit 251.

Furthermore, of course, the pieces of information that are matched to the keyword may include text information, image information, and the like that are obtained by analyzing the pieces of collected information. For example, in a case where text "PIZZA Paradise" is recognized in any one piece of information among the pieces of already-collected information, when the user inputs a keyword "PIZZA," the controller 180 detects the recognized text information "PIZZA Paradise" using the information that is matched to the keyword that in input. Then, the controller 180 displays information corresponding to the detected text information "PIZZA Paradise," among the pieces of already-collected information, on the display unit 251.

At this point, the controller 180 displays the information found in various forms. For example, the controller 180 displays the pieces of information found in a list form including a thumbnail image. Alternatively, the controller 180 may the pieces of information found using the map information. In addition, for display, the controller 180 orderly arranges the pieces of information found according to a predetermined condition. For example, for display, the controller 180 orderly arranges the pieces of information found in chronological order from the first-stored information to the last-stored information or vice versa for display. Alternatively, the controller 180 senses current location of the user, and orderly arranges the pieces of collected information in order from the information collected furthest from the current position of the user to the information collected closest to the current position of the user or vice versa for display.

Furthermore, for display, the controller 180 orderly arranges the found items of information according to predetermined order of priority. At this point, the predetermined order of priority may be based on a result (for example, order of increasing recognition precision or alphabetical order) of performing the text recognition on the pieces of collected information, and may be determined based on the period of time for which the user's gaze has been fixed when collecting information. That is, the controller 180 further collects information on the time at which the user's gaze is fixed when collecting information. For display, the controller 180 orderly arranges the pieces of information that are found by conducting the search at the request of the user, according to the period of time for which the user's gaze has been fixed.

On the other hand, when the pieces of information corresponding to the keyword that is input by the user is found, the controller 180 selects any one piece of already-collected information in accordance with the user's selection from among the pieces of information found (S902). For example, the controller 180 senses a predetermined gesture that is made by the user, and selects any one piece of information found from among the pieces of information found based on the sensed gesture. In this case, any one piece of information selected by the user is displayed, in a close-up state, on the display unit 251. At this point, an example in which based on the gesture made by the user, any one piece of information found is selected from among the pieces of information found is described in more detail referring to FIG. 13A(a) to 13A(f).

On the other hand, the pieces of information that are selected in Step S902 include various pieces of attribute information. For example, the controller 180 further displays information on the time or the place at which the selected information is collected, on the display unit 251. Alternatively, the controller 180 may further display the attribute information extracted from the currently-selected information, like the text, the image, or the like that is recognized in the selected information, on the display unit 251 (S904).

On the other hand, when the pieces of attribute information are displayed on the display unit 251, the user can select any one piece of attribute information from among the pieces of attribute information that are displayed along with information in a close-up state, and conducts a search on pieces of information based on the selected attribute information. Then, the pieces of information found are orderly displayed and the orderly-displayed pieces of information found are displayed on the display unit 251 (S906).

For example, the user can select any one piece of attribute information from among the pieces of attribute information relating to the currently-selected information, through a predetermined gesture or the like. In this case, based on the gesture made by the user that is sensed, the controller 180 searches for information that has the same attribute as that of the selected attribute information or for information that has an attribute similar to that of the selected attribute information, and displays a result of the search on the display unit 251.

Figure 13B:
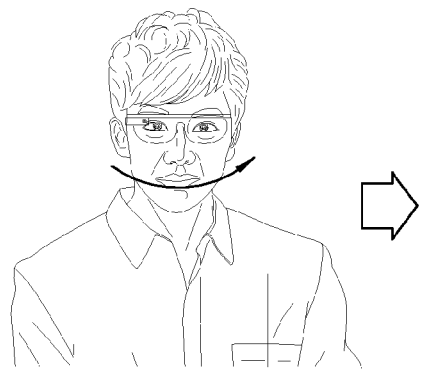
FIGS. 13A(a) to 13A(f) and 13B(a) to 13B(f) are diagrams illustrating examples in which in the glasses-type terminal according to the present invention, the pieces of already-collected information are searched for based on the gesture made by the user.
Figure 13B:
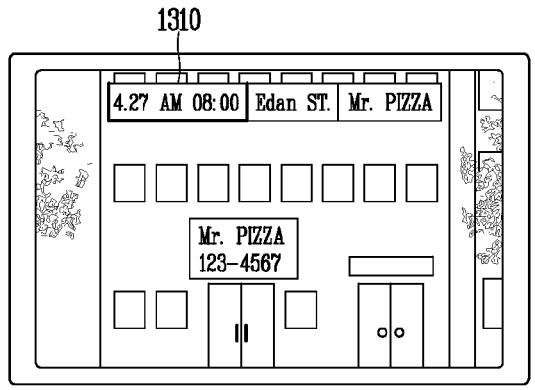
Figure 13B:
Figure 13B:
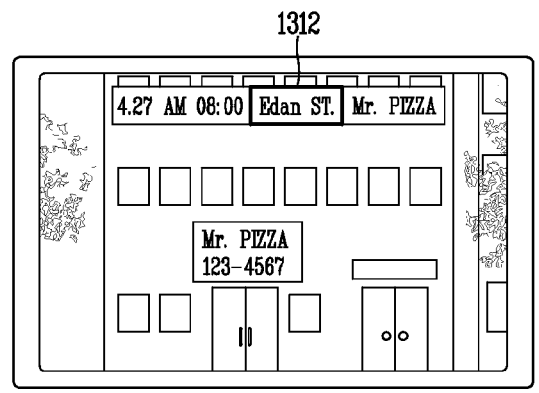
Figure 13B:
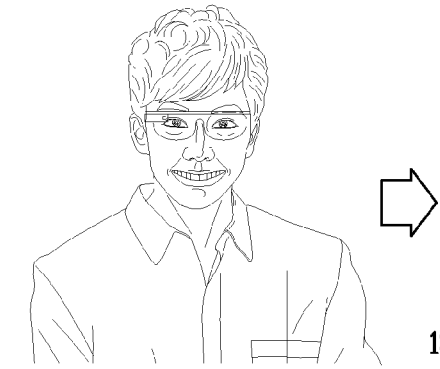
Figure 13B:
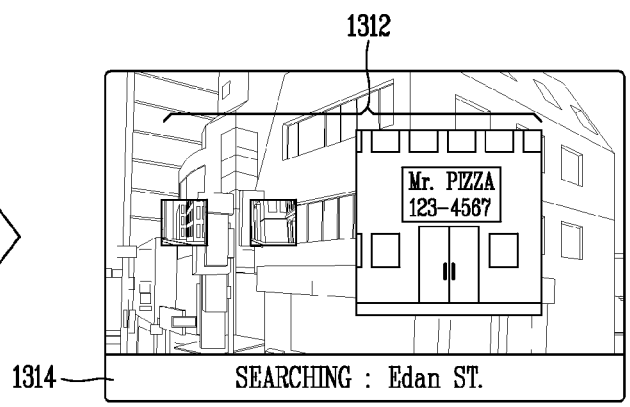

An example in which, based on the gesture that is sensed in this manner, the pieces of already-collected information are searched for the same or similar attribute information is described in more detail referring to FIGS. 13B(a) to 13B(f).

On the other hand, based on the attribute information that the user selects in Step S906, the controller 180 determines whether or not new pieces of information are found as a result of the search (S908). Then, in a case where it is determined that as a result of the determination in Step S908, new pieces of information are found, the controller 180 returns to Step S902, and selects any one found piece of information in accordance with the user's selection from among the pieces of information found. Then, the controller 180 repeatedly performs the processes in Steps S904, S906, and S908.

However, in a case where as a result of the determination in Step S908, new pieces of information are not found, that is, in a case where the user does not select specific attribute information, the controller 180 determines whether or not the user selects an option of stopping displaying the pieces of information found (S910). Then, in a case where as a result of the determination in Step S910, the user does not select the option of stopping the displaying, the controller returns to Step S906 and determines that the user selects any one piece of information from among the pieces of information that are currently displayed in a close-up state.

However, when as a result of the determination in Step S910, the user selects the option of stopping the displaying, the controller 180 stops displaying the pieces of information found back on the display unit 251.

The operational processes are described above in which the controller 180 of the glasses-type terminal 200 according to the present invention collects the information relating to something the user gazes toward, and displays pieces of information that are obtained by searching the pieces of collected information at the request of the user.

An example is described in more detail below in which in the glasses-type terminal 200 according to the embodiment of the present invention, according to the above-described operational processes by the controller 180, the information relating to something that the user gazes toward is collected and, according to the user's selection, is displayed on the display unit 251.

Figure 10A:
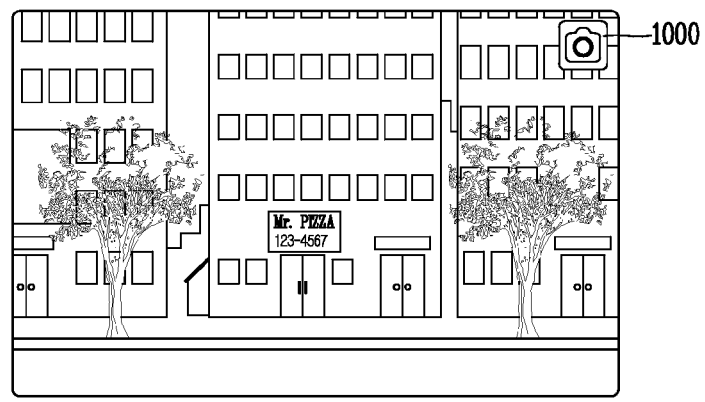
FIGS. 10A to 10C are diagrams illustrating an example in which the information relating to something that the user gazes toward is collected in the glasses-type terminal according to an embodiment of the present invention.
Figure 10B:
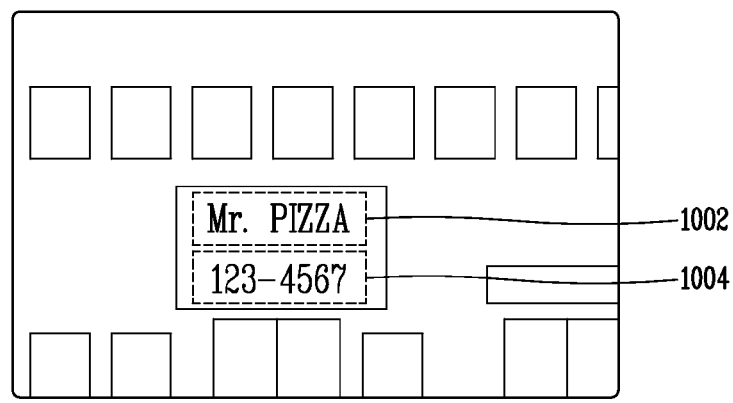
Figure 10C:
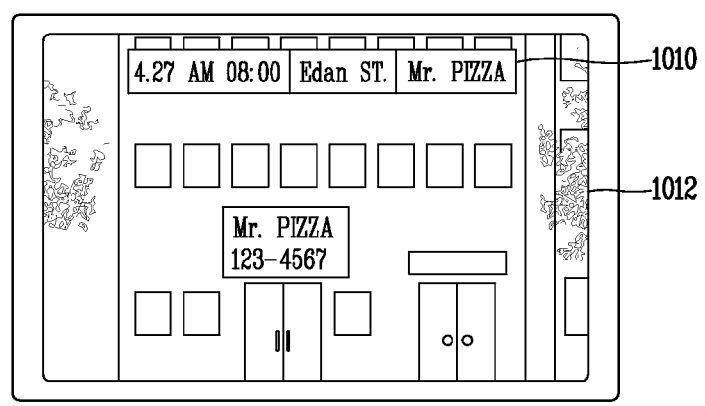

FIGS. 10A to 10C illustrate an example in which in the glasses-type terminal 200 according to the embodiment of the present invention, the information relating to something which the user gazes toward is collected through the camera 221.

As described above, in the case where the user's gaze has been fixed for a predetermined period of reference time or longer, the controller 180 automatically operate the camera. Alternatively, in a case where the user makes a predetermined gesture, or in a case where the user applies a tap, a predetermined number of times or more, to the main body or applies a touch input to a specific point, the controller 180 may operate the camera 221. In this case, as illustrated in FIG. 10A, the controller 180 displays a graphic object 1000 indicating that the camera 221 is in an operated state, on the display unit 251, in order for the user to recognize that the camera 221 is currently in operation.

When the camera 221 is operated in this manner, the controller 180 stores an image that is captured through the camera 221, in the format of a static image or a moving image, automatically, or based on the user's selection, such as when a predetermined gesture is made or when multiple taps are applied to the main body of the glasses-type terminal 200. Then, the stored information is collected as information relating to something that the user gazes toward. In addition, in a case where, in a state where the camera 221 is in operation, the user applies the same input, that is, makes a predetermined gesture, or applies a tap a predetermined number of times or more to the main body, or applies a touch input to a predetermined point, the controller 180 may turn off the camera 221 in order for the camera 221 to return to its previous state. When the camera is turned off in this manner, the graphic object 1000 may not be displayed on the display unit 251 either.

On the other hand, as described above, the controller 180 further extracts attribute information from the stored static image and moving image, using the text recognition and the like. For example, as illustrated in FIG. 10B, in a case where text-recognizable portions 1002 and 1004 are included in the collected information, the controller 180 recognizes this, and stores a result of the recognition as attribute information relating to the collected information. In this case, when the collected information is displayed on the display unit 251 at the request of the user, the controller 180 displays the extracted attribute information along with the collected information.

FIG. 10C illustrates an example of this.

FIG. 10C illustrates examples of attribute information 1010 relating to information 1012 that is collected based on the user's selection in FIG. 10A, and of attribute information 1010 relating to the collected information 1012. As illustrated in FIG. 10C, the collected information 1012 is picture information that is captured by the camera 221, and the attribute information is information that includes the time ("4.27 AM 08:00" and the place ("Edan St.(street)") at which the information is collected, and the information that is extracted from the collected picture information 1012, that is, a result of the text recognition ("Mr. PIZZA").

On the other hand, FIGS. 11A(a) and 11A(b) and 11B(a) and 11B(b) illustrate examples in which information relating to something that the user gazes toward is collected using information on the location of the user in the glasses-type terminal according to the present invention.

The controller 180 begins to collect information in a case where the user's gaze has been fixed for a predetermined period of reference time or longer, or the user applies a tap a predetermined number of times or more to the main body, or applies a touch input a predetermined point. In this case, of course, the controller 180 may display a graphic object indicating a state where information is currently collected, on the display unit 251, in order for the user to recognize the state where the information is currently collected.

Then, when the information begins to be collected, the controller 180, as illustrated in FIG. 11A(a), senses current location of the user. Then, the controller 180 senses a direction 1102 of the user's gaze. Then, the controller 180 detects a place 1110 on which the user's gaze has been fixed for a predetermined period of time or longer as illustrated in FIG. 11A(b), using map information relating to the current location of the user.

At this point, the controller 180 preferentially stores a path 1100 along which the user moves, a direction 1102 of the user's gaze, a period of time for which the user has gazed toward a specific direction, and the time at which the user gazes toward a specific direction. Then, in a case where the glasses-type terminal 200 can be connected later to a predetermined website or server, of course, the controller 180 may detect the place 1110 on which the user's gaze has been fixed for a predetermined period of time or longer, using the stored data such as a path 1100 along which the user moves, a direction 1102 of the user's gaze, a period of time for which the user has gazed toward a specific direction, and the time at which the user gazes toward a specific direction, from to the website or server.

Figure 11B:
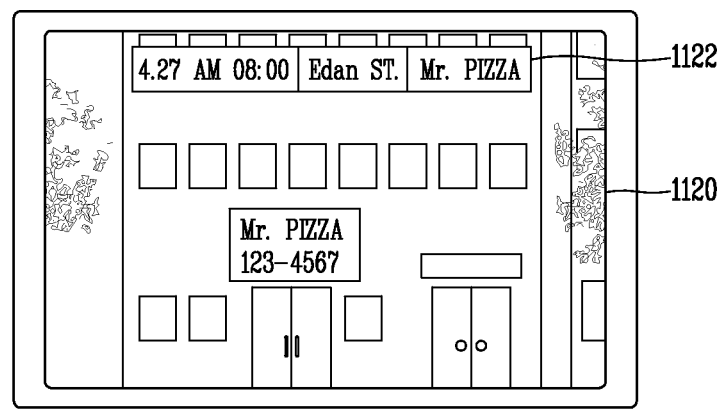

On the other hand, when the place 1110 on which the user's gaze has been fixed for a predetermined period of time or longer is detected, the controller searches for information relating to the place 1110. For example, the controller 180 detects address information on the place 1110 corresponding to something on which the user's gaze has been fixed for a predetermined period of time or longer, through map information on a district in which the user stays currently, and detects information on which shop is located in the place 1110, information on the name of the place 1110, and the like, using the detected address information. FIG. 11B(a) illustrates an example of this.

On the other hand, as illustrated in FIG. 11B(a), when pieces of information relating to the place 1110 corresponding to something on which the user's gaze has been fixed for a predetermined period of time or longer is found as a result of the search, the controller 180 stores the pieces of information found as information relating to the place 1110. At this point, the controller 180 selects representative information from among the pieces of information found. For example, image information on and/or shop-name information on the place 1110 are pieces of representative information.

Therefore, as illustrated in FIG. 11B(a), in a case where related information is present among the pieces of information found, the controller 180 selects the related image (Mr_PIZZA.jpg") as representative image, stores the selected related image as information that is collected based on the user's gaze that has been fixed for the predetermined period of reference time or longer, and stores the pieces of collected information as related attribute information.

FIG. 11B(b) illustrates an example of this. The example is illustrated in which at the request of the user, the image information ("Mr_PIZZA.jpg") 1120 relating to the place, which is found as a result of the search based on the information on the location of the user and the direction of the user's gaze, and the pieces of information found are displayed as attribute information (1122).

Figure 12A:
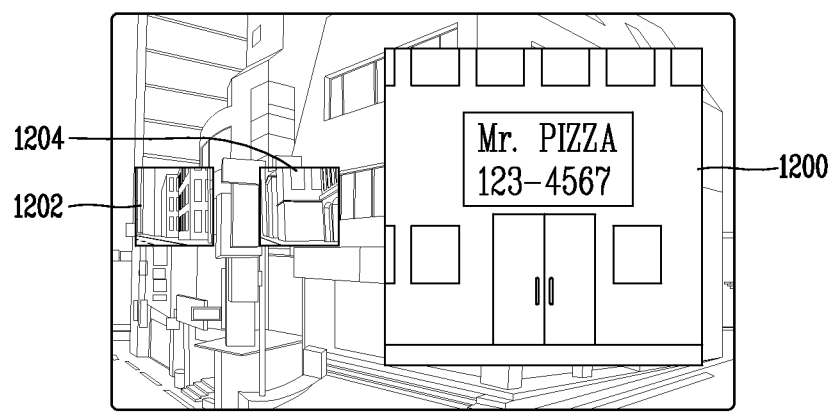
FIGS. 12A(a) and 12A(b) and 12B(a) and 12B(b) are diagrams illustrating examples of displaying at least one piece of collected information among the pieces of information in the glasses-type terminal according to the embodiment of the present invention, at the request of the user.
Figure 12A:
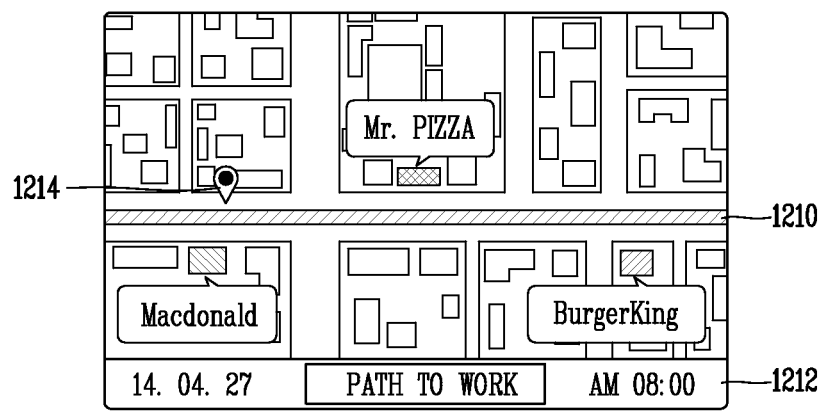

On the other hand, FIGS. 12A(a) and 12A(b), to 12B(a) and 12B(b), and 12C(a) and 12C(b) are diagrams illustrating examples in which at least one piece of information among the pieces of collected information is displayed at the request of the user in the glasses-type terminal according to the present invention.

First, FIG. 12A(a) illustrates examples in which at the request of the user, the information found is displayed in the list form including a thumbnail image. For example, in a case where, for example, specific keywords such as "today, morning, Path to Work" are input, the controller 180 searches the pieces of already-collected information for pieces of information 1200, 1202, and 1204 that are matched to the keywords and displays a result of the search as illustrated in FIG. 12A(a).

In this case, as described above, for display on the display 251, the controller 180 orderly arranges the pieces of information found 1200, 1202, and 1204 based on the period of time for which the user has gazed toward a specific direction, a distance from the current location of the user, the time at which the information is collected, or and the like. FIG. 12A(a) illustrates an example of this.

On the other hand, the glasses-type terminal 200 according to the present invention may display the pieces of collected information in forms other than the list form. For example, the controller 180, as illustrated in FIG. 12A(b), the controller 180 may display the pieces of collected information 1210, 1212, 1214, on the map information on the district in which the user currently stays. In this case, as illustrated in FIG. 12A(b), pieces of information on the places that are located within a predetermined distance from current location 1214 of the user are preferentially displayed on the display unit 251. Then, according to the user's selection, pieces of information on places that are located farther from the current location 1214 are displayed on the display unit 251.

On the other hand, as illustrated in FIGS. 12A(a) and 12A(b), in a case where the pieces of collected information are displayed at the request of the user, a result of recognizing the request of the user and the like are further displayed on the display unit 251. The controller 180 may display search keywords, for example, "14.04.27, Path to Work, AM 08:00" 1212 on the display unit 251. Accordingly, the user can check whether or not a request that he/she inputs is correctly recognized, and the search keywords that are used to search for the pieces of information that are currently displayed on the display unit 251.

Figure 12B:
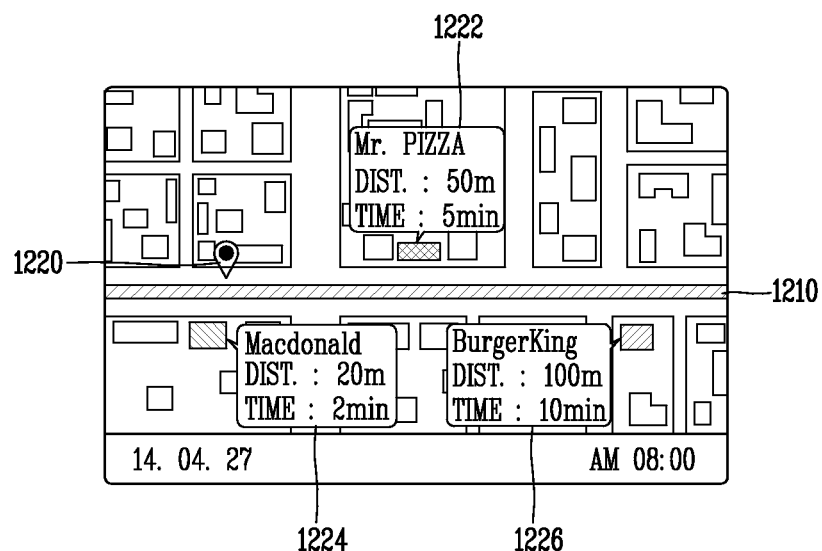
FIGS. 12C(a) and 12C(b) is diagrams illustrating an example of displaying pieces of information on a period of time for which the user has gazed toward something and on the number of times that the user has visited a corresponding place in the glasses-type terminal according to the embodiment of the present invention.
Figure 12B:
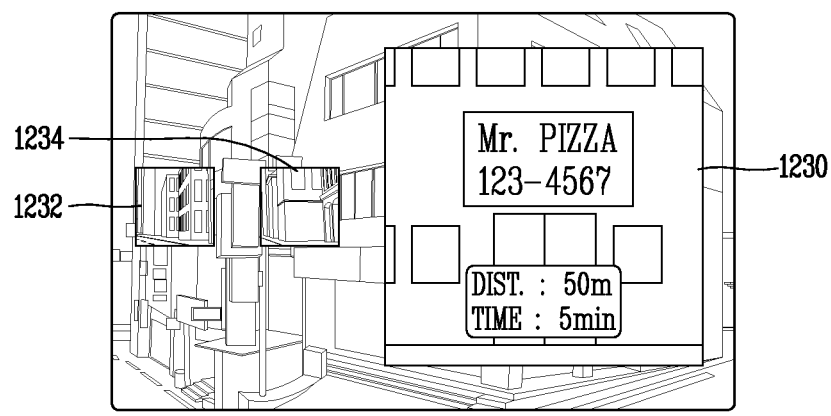

On the other hand, as described above, the glasses-type terminal 200 according to the present invention may further provide additional information on the current location of the user. FIGS. 12B(a) and 12B(b) illustrate an example of this. The example is illustrated in which at the request of the user, the information found is provided using the map information or the list form including the thumbnail image.

First, as illustrated in FIG. 12B(a), in a case where the information found is provided using the map information, the controller 180 provides a distance "DIST" from the current location of the user to each of the pieces of information found 1222, 1224, and 1226, and the time "TIME" taken to move to each of the pieces of information found 1222, 1224, and 1226. At this point, the controller 180 measures the time taken to get to each of the pieces of information found 1222, 1224, and 1226, based on a moving means (for example, on foot or bicycling) that is set by the user. In a case where the changes the moving means, the time taken to get to the information found is subject to change.

On the other hand, FIG. 12B(b) illustrates an example in which in a cases where the information found is provided in the list form including the thumbnail, pieces of information on the distance "DIST" from the current location of the user and on the time "TIME" taken to get to the information found are provided. In this case, as illustrated in FIG. 12B(b), the controller 180 may orderly arrange the pieces of collected information 1230, 1232, and 1234 according to predetermined order of priority and may the pieces of information on the distance from the current location of the user and on the time taken to get to the information found are displayed on at least one among the pieces of information found 1230, 1232, and 1234.

On the other hand, at the request of the user, the glasses-type terminal 200 according to the present invention may provide pieces of information on the period of time for which the user's gaze has been fixed and on the number of times that the user has visited the corresponding place, along with the information found.

Figure 12C:
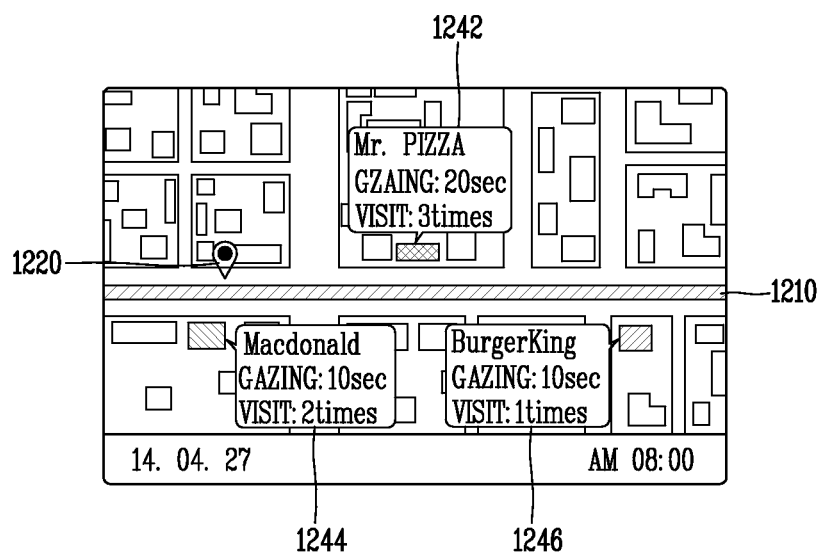
Figure 12C:
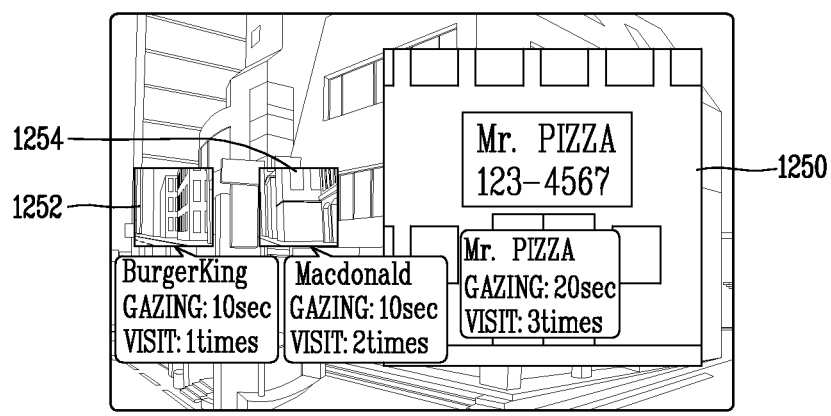

FIGS. 12C(a) and 12C(b) illustrate an example of this.

First, FIG. 12C(a) illustrates an example in which in a case where the pieces of information found are displayed in the display unit 251 using the map information, the pieces of information found are displayed. In this case, the information on the period of time "GAZING" for which the user has gazed toward something relating to the corresponding place is displayed along with the locations of the pieces of information found on the map information. In addition, as illustrated in FIG. 12(a), in a case where the user has visited ("VISIT") the corresponding place, a record of the user's visit is also included in the information found. At this point, information on the user's visit is checked by sensing the location of the user, or by the user's selection. Alternatively, the information on the user's visit is checked using a record of the use of an RF chip or an NFC chip installed in the corresponding place, or a record of payment by a user's credit card in the corresponding place.

On the other hand, as illustrated in FIG. 12C(a), these pieces of information are further displayed in a case where the pieces of information found are provided not only through the use of the map information, but also in the list format including the thumbnail image. For example, as illustrated in FIG. 12C(b), in the case where the pieces of information found are displayed in the list form, the pieces of information on the period of time "GAZING" for which the user has gazed toward something relating to the corresponding place and/or on the record of the user's visit ("VISIT") to the corresponding place are displayed in the vicinity of thumbnail images 1250, 1252, and 1254.

On the other hand, in the glasses-type terminal according to the embodiment of the present invention, the user can begin to collect information or to stop collecting the information, in various methods or can input a keyword to select any one piece of information found from among the pieces of information found. In addition, the user can select at least one piece of information from among the pieces of information found. The various methods here, as described above, involve a predetermined gesture made by the user, an electromyogram change in accordance with a change in the user's facial expression, multiple taps on the main body of the glasses-type terminal 200, a touch input to a specific point, and so forth.

FIGS. 13A(a) to 13A(f) and 13B(a) to 13B(f) illustrate examples in which in the glasses-type terminal according to the present invention, the pieces of already-collected information are searched for based on the gesture made by the user.

For example, as illustrated in FIG. 13A(a), in a case where the user shakes his/her head back and forth by a predetermined angle or greater, the controller 180 determines this as a user input for searching specific information among the pieces of already-collected formation. In this case, the controller 180 operates the microphone 122 into which a user's voice is input. In this case, the controller 180 indicates that the microphone 122 is in operation, using a predetermined graphic object 1300.

Then, in a case where the user makes the gesture (the gesture in which the user shakes his/her head back and for by a predetermined angle or greater) once more, the controller 180 determines this as an user input for stopping inputting a voice and switches the microphone 122 to an OFF state. Then, in this case, the controller 180 may display a predetermined different graphic object for causing the graphic object 1300 to disappear from the display unit 251 or for indicating that microphone 122 is in the OFF state, on the display unit 251.

On the other hand, in a case where the microphone 122 is in operation, the controller 180 enables a user's voice signal to be input into the microphone 122 as a keyword for searching for specific information. Then, the controller 180 searches the pieces of already-collected information for pieces of information matched to the keyword information that is input, and displays pieces of information found on the display unit 251. In this case, the user selects any one piece of displayed information from among the pieces of displayed information. This selection is also made through the gesture made by the user.

For example, as illustrated in FIG. 13A(c), the user can make a gesture in which he/she shakes his/her head side to side by a predetermined angle or greater. In this case, the controller 180 selects any one piece of information found from among the pieces of information found, based on a direction in which the user shakes his/her head. For example, in a case where the user moves his/her head leftward, the controller 180 temporarily selects information that is positioned to the left of any one piece of information 1302 that is currently temporarily selected from among the pieces of information found. In this case, the temporarily-selected information, as illustrated in FIG. 13A(d), is displayed in a manner that distinguishes itself from pieces of different information (that is, in the form of a larger-sized thumbnail image). In addition, at this point, in a case where the user shakes his/her head a number of times in a specific direction, the controller 180 displays pieces of information positioned in a direction in which the user shakes his/her head, of which the number corresponds to the number of times that the user shakes his/her head.

On the other hand, the user can select the information that is currently temporarily selected and display the selected information on the display unit 251 in a close-up state. For example, in a case where, as illustrated in FIG. 13A(e), the user makes a specific facial expression, the controller 180 senses an electromyogram change in the user's facial muscles or a change in the shapes of the user' eyes. In this case, the controller 180 determines the currently temporarily-selected information as information of which a close-up view is selected by the user. FIG. 13A(f) illustrates an example in which in this case, the information is displayed in a close-up state.

On the other hand, pieces of attribute information relating to the currently-selected information are displayed on the information that is displayed on a close-up state in this manner. In this case, the user selects any one piece of attribute information from among the pieces of attribute information, and searches the pieces of already-collected information for pieces of information with the same attribute information. Then, a result of the search is displayed on the display unit 251.

FIG. 13B(a) to 13B(f) illustrate an example of this.

As described above, when specific information is displayed in a close-up state on the display unit 251, using various methods, the controller 180 selects any one piece of attribute information from among the pieces of attribute information that are displayed on the information displayed in a close-up state. The various methods here involve a predetermined gesture made by the user, an electromyogram change in accordance with a change in the user's facial expression, multiple taps on the main body of the glasses-type terminal 200, a touch input to a specific point, and so forth.

For example, as illustrated in FIG. 13B(a), in a case where the user bends his/her head back in a specific direction, the controller 180 determines this as a user input for selecting any one piece of attribute information from among the pieces of attribute information relating to the information currently in a close-up state. Therefore, as described in FIGS. 13B(a) to 13B(c), in the case where the user bends his/her head back in a specific direction, the controller 180 selects any one piece of attribute information from among the pieces of attribute information relating to the information currently in a close-up state, based on the direction in which the user bends his/her head back. FIGS. 13B(b) and 13B(d) illustrate an example of this. The example is illustrated in which the attribute information selected by the user is changed from the collection time 1310 "4.27 am 08:00" to the collection place "Edan Street" 1312.

As described in FIG. 13B(d), when specific attribute information is selected by the gesture made by the user, the user can conduct a search based on the currently-selected attribute information. For example, in a case where, as illustrated in FIG. 13B(e), the user makes a specific facial expression, the controller 180 senses an electromyogram change in the user's facial muscles or a change in the shape of the user' eyes. In this case, the controller 180 determines that the user selects a search that is based on the currently-selected attribute information. Accordingly, the controller 180 searches for pieces of information that has the attribute information selected by the user, that is, the same attribute information as the collection place "Edan Street" as illustrated in FIG. 13B(d), and display a result of the search on the display unit 251. FIG. 14B(f) illustrates an example in which a result of searching the pieces of already-collected information for pieces of information that has the attribute information "Edan Street" is displayed on the display unit 251.

On the other hand, the case is described above where the movement of the head is sensed and is used in order to select specific information or specific attribute information from among the pieces of collected information. However, in addition to the movement of the head, of course, a movement of the pupil or a gesture in which a predetermined body portion, for example, the hand side or the like, is shaken by side may be possible.

In addition, in the case where specific information or specific attribute information is selected from among the pieces of collected information, of course, a touch input that is sensed as being applied to a specific portion of the main body of the glasses-type terminal 200 may be used. For example, when a user's touch input is applied in the vicinity of a glass corresponding to the user's left eye, based on the number of times that the touch input is applied, the controller 180 determines that information or attribute information that is positioned to the left of the information found or the attribute information which is currently temporarily selected is temporarily selected by the user. Similarly, when the user's touch input is applied in the vicinity of a glass corresponding to the user's right eye, the controller 180 determines that information or attribute information that is positioned to the right of the information found or the attribute information which is currently temporarily selected is temporarily selected by the user. In addition, when the user's touch input is sensed as being applied in the vicinity of the center of the main body of the glasses-type terminal 200, it may be determined that the information found or the attribute information which is currently temporarily selected is selected by the user for the close-up view or for the search in accordance with the corresponding attribute information.

As described above, the glasses-type terminal 200 according to the present invention collects information relating to a direction of the user's gaze, automatically or based on the user's selection, and provides the user with the collected information at the request of the user. At this point, the pieces of collected information include picture information such as a static image or a moving image. Information, such as a result of text or image recognition, that is obtained by analyzing the pieces of collected information is further collected. In addition, of course, sound information and the like may be collected whenever necessary.

Then, the user can be provided with at least one piece of information, among the pieces of collected information, using the microphone 122 or the like. Then, as illustrated in FIGS. 10A to 13B(f), the pieces of information that are provided at this point, are, for example, in the list form including the thumbnail image or in the form of a text image that is displayed on the map image. Then, in this manner, when the user selects any one piece of information found from among the pieces of information found, the controller 180 provides more detailed corresponding information. For example, in a case where the collected information is moving image information, the controller 180 may display the collected information in the form of a moving image on the display unit 251 using an application corresponding to the collected information. Furthermore, in a case where the collected information is static image information, the controller 180 may display the static image information in a close-up state on the display unit 251.

In this manner, in a case where any one piece of information found is selected from among the pieces of information found, the controller 180 provides the user with the corresponding information in the suitable form. In this manner, the controller 180 determines a form suitable for providing the information, according to a type of collected information, and provides more suitable information. For example, in a case of the information that is collected using the information on the location of the user and the map information instead of the camera 221, the controller 180 may provide text information instead of an image or a moving image, among the pieces of information that are collected through the search.

In addition, the controller 180 may provide various pieces of additional information based on the user's selection. For example, the controller 180 may sense current location of the user, and thus may provide the current location of the user and information (for example, the distance to the information found, the time taken to get to the information found, and the like) relating to the information found. Alternatively, the controller 180 may provide various pieces of attribute information (the collection time and the collection place, or pieces of analysis information such as a result of the text recognition) relating to the information found.

On the other hand, the controller 180 further take into consideration a change in the moving state of the user in collecting information. For example, based on the change in the moving state of the user, the controller 180 determines whether the user is within or out of a vehicle, based on the change in the moving state of the user. Then, based on this, the controller 180 categorizes information that is currently collected, as parking information. At the request of the user, the controller 180 provides the pieces of collected information based on a method of providing the parking information.

Figure 14A:
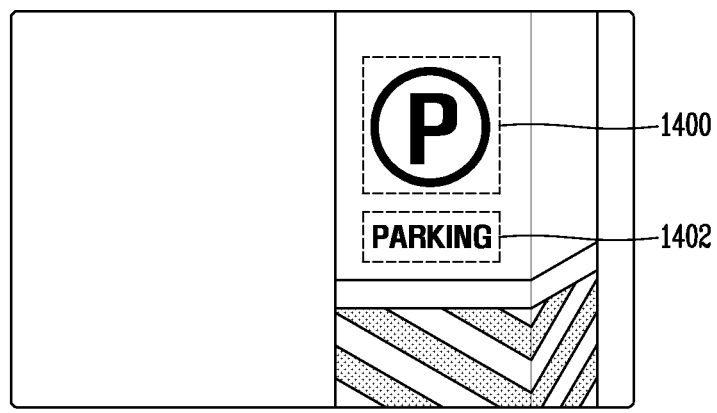
FIGS. 14A(a) and 14A(b) and 14B(a) and 14B(b) are diagrams illustrating examples in which parking information is collected and is provided to the user in the glasses-type terminal 200 according to the present invention.
Figure 14A:
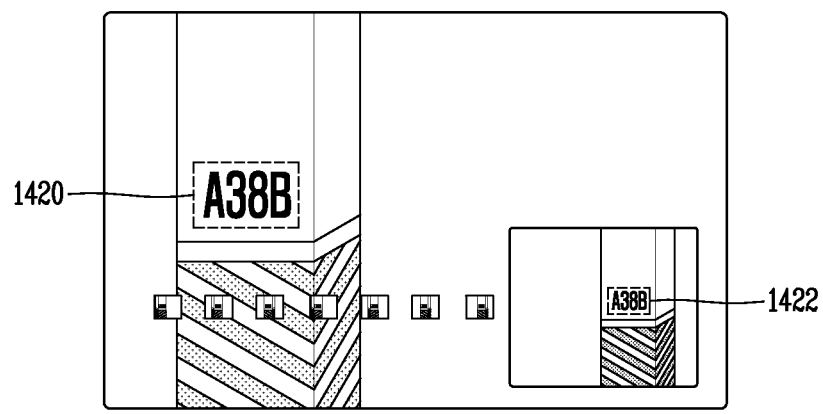
Figure 14B:
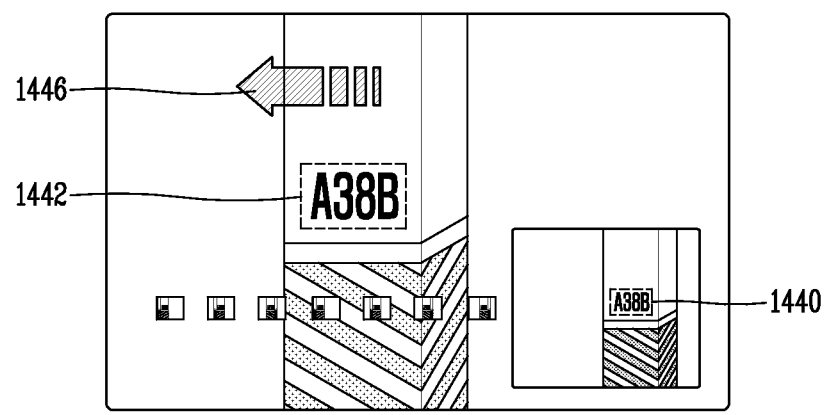
Figure 14B:
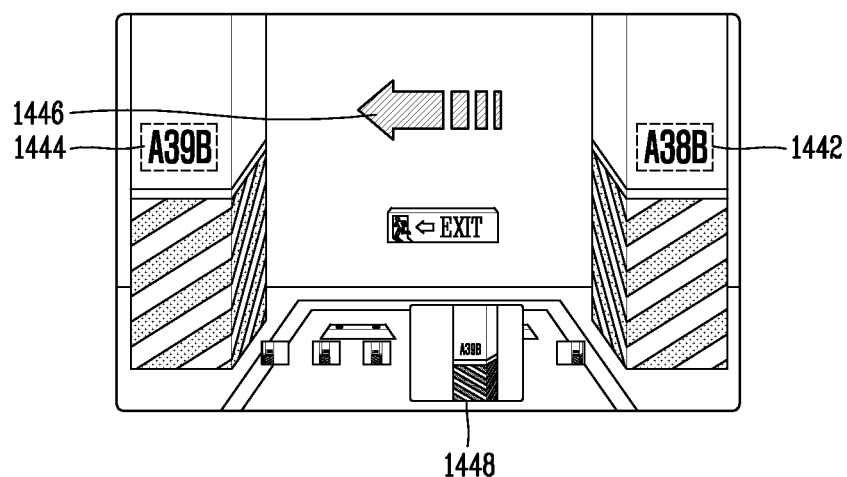

FIGS. 14A(a) and 14A(b) and 14B(a) and 14B(b) illustrate examples in which the parking information is collected and is provided in the glasses-type terminal 200 according to the present invention.

As described above, the glasses-type terminal 200 according to the present invention determines the state of the moving state of the user based on the user's selection, and categorizes the information that is currently collected, as parking information and stores a result of the categorizing. In this case, the controller 180 collects information relating to something that the user gazes toward, by operating the camera 221 based on the user selection such as when multiple taps are applied to the main body of the glasses-type terminal 200, when a touch input is applied to a predetermined specific portion, or when as a predetermined gesture is made.

FIGS. 14A(a) and 14A(b) illustrate an example in which in such a case, the information is collected. For example, in a case where the user parks a vehicle in an indoor parking lot and gets off the vehicle, the controller 180, as illustrated in FIG. 14A(a), collects at least at least one piece of information relating to the direction of the user's gaze, based on the user's selection, the period of time for which the user's gaze has been fixed, or the like. Then, the controller 180 further performs an analysis of the collected information (for example, text recognition or image recognition) and stores a result of the analysis as attribute information relating to the collected information.

Therefore, as illustrated in FIG. 14A(a), in a case where text "parking" 1402 or an image "ⓟ" 1402 that indicates a parking lot is included, information that is obtained by recognizing such text or such an image, for example, information such as "ⓟ" or "parking" is stored as attribute information.

Alternatively, the controller 180 further takes into consideration not only the moving state of the user, but also a surrounding environment in categorizing the information that is collected, as parking information, and storing a result of the categorizing. For example, in a case where a speed at which the location of the user moved is suddenly slow or a predetermined vehicle comes to a stop and the user is moves a given distance or more away from the predetermined vehicle, the controller 180 determines that the user gets off the predetermined vehicle. In this case, based on the user's selection (for example, such as when multiple taps are applied to the main body), the controller 180 may operate the camera 221 and may collect information that is collected through the camera 221, as parking information, based on an image that is captured through the camera 221.

For example, as illustrated in FIG. 14A(a), in a case where text "parking" 1402 or an image "ⓟ" 1402 that indicates that current location of the user is a parking lot is captured through the camera 221, the controller 180 recognizes that the user is currently within the parking lot. Then, in a case where the user gets off a vehicle and is currently within the parking lot, the controller 180 may collect picture information relating to a direction of the user's gaze, as parking information, based on the user's selection, the period of time for which the user's gaze has been fixed, or the like.

On the other hand, in a case where the user makes a request for the parking information, the controller 180 displays information that is categorized as the parking information, on the display unit 251. In addition, in a case where among images that are captured through the camera 221, an image that is matched to the already-collected parking information is present, the controller 180 displays the image being matched in a manner that distinguishes the image being matched from other pieces of parking information.

Therefore, as illustrated in FIG. 14A(b), in a case where as a result of analyzing an image that is captured through the camera 221, text "A38B" 1420 is recognized, the controller 180 displays information 1422 that is matched to the text "A38B," among the pieces of information that have already been collected as parking information, in a manner that distinguishes the information 1422 from other pieces of information. In this case, the user can recognize that something that he/she gazes toward corresponds to any one piece of parking information among the pieces of already-collected parking information, and can accordingly find the place at which his/her vehicle was parked, in an easier manner, using the collected information.

On the other hand, of course, the collected information may further include information on a moving path along which the user moves. FIGS. 14B(a) and 14B(b) illustrates an example in which the parking information is provided in the glasses-type terminal 200 according to the present invention.

For example, as illustrated in FIG. 14B(a), in a case where as a result of analyzing an image that is captured through the camera 221, text "A38B" 1442 is recognized, the controller 180 displays information 1440 that is matched to the text "A38B," among the pieces of information that have already been collected as parking information, in a manner that distinguishes the information 1422 from other pieces of information. In addition, information on the path along which the user moves at the time of collecting the information 1440 being matched may be further displayed as a graphic object 1446 that uses augmented reality. At this point, the controller 180, as illustrated in FIGS. 14B(a) and 14(b), may display the graphic object 1446 in the direction opposite to the path along which the user moved in the past. This is because the user moves back along the path in order to find the place at which his/her vehicle has been parked.

As illustrated in FIG. 14B(b), the controller 180 checks whether or not information is present that is recognizable in a new image that is captured as the user moves, and display the already-collected information that corresponds to the detected information in a manner that distinguishes the already-collected information from other pieces of information. Accordingly, as illustrated in FIGS. B(b), when text "A39B" 1444 is recognized in an image that is captured through the camera 221, the already-collected information 1448 corresponding to the cognized text "A39B" 1444 is displayed. Accordingly, the user can intuitively recognize that he/she moves back along the path along which he/she moved after parking his/her vehicle.

At this point, the information on the path along which the user moves is generated based on location at which the predetermined vehicle is parked and on current location of the user, using map information on a building in which the user currently stays. At this point, the map information on the building in which the user currently stays is one piece of information that is stored in the memory 170, or that is downloaded from a predetermined website or an external server.

On the other hand, of course, the information on the path along which the user moves may be collected through various methods. For example, when the parking information is collected, the controller 180 collects information relating to a moving direction of the user and a moving speed of the user at the time of collecting the parking information, using an inertial sensor, a gravity sensor, compass sensor, or the like. Then, a graphic object 1446 for displaying the path along which the user moves is generated based on the collected information and is displayed on the display unit 251.

Therefore, regardless of the current direction of the user's gaze, the graphic object 1446 is displayed on the display unit 251. Furthermore, the graphic object 1446 is displayed on the display unit 251, changing according to a moving state of the user. Therefore, the user can check the path along which he/she moved immediately after parking his/her vehicle, using the graphic object 1446, and thus find more easily the place at which his/her vehicle has been parked.

On the other hand, the specific embodiments of the present invention are described above, but various modifications to the specific embodiments may be possible without departing from the scope of the present invention. Specifically, according to the embodiments of the present invention, the case where only the user's gaze has been fixed for a predetermined period of time or longer is described, but, of course, a case where the user gazes a predetermined number of times toward a specific direction may be a condition for collecting the information.

Furthermore, the case assuming the microphone or the camera is turned on or off with multiple taps that are applied to the main body or with a gesture is described above, but of course, the micro phone or the camera may be always turned on.

Effects of the glasses-type terminal according to the present invention and the method of controlling the glasses-type terminal are described as follows.

According to at least one of the embodiments of the present invention, the information relating to something that the user gazes toward is collected based on the period of time for which the user's gaze has been fixed. This provides an advantage that the place that the user is interested in can be identified and the information on the identified place can be provided to the user without going through a separate process of collecting information.

In addition, according to at least one of the embodiments of the present invention, the identified place and the information relating to the current location of the user, as well as the information relating to the identified place are further provided. This provides an advantage that the user can find a desired place in an easier manner.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling an eyewear-type terminal, the terminal comprising a display, a camera, a memory, and a sensor configured to generate data relating to positioning of the terminal, the method comprising:
    identifying a path along which a user wearing the terminal moves during a period of time;
    turning on the camera and displaying on the display a graphic object indicating that the camera is in operation and that information related to an object is being collected when a gaze direction of the user sensed by the sensor is not changed for a reference period, wherein the information related to the object comprises a representative image of the object captured by the camera and attribute information associated with the object, and wherein the attribute information comprises at least a time and a location at which the representative image is captured and a duration of a gaze directed to the object which results in the representative image;
    storing, in the memory, the representative image of the object and the attribute information related to the object, wherein the memory further stores a plurality of representative images of a plurality of objects captured while the user wearing the terminal moves through the path and a plurality of attribute information of the plurality of objects associated with the plurality of objects; and
    displaying, on the display, at least one of the plurality of representative images in response to a user input comprising a keyword designating the path and one of the attribute information.

2. The method of claim 1, wherein:
    the user input further comprises at least multiple taps that are applied to a portion of the terminal or a predetermined gesture generated by the user.

3. An eyewear-type terminal wearable by a user, comprising:
    a display;
    a camera;
    a memory;

a sensor configured to generate data relating to positioning of the terminal; and a controller configured to:

identify a path along which the user wearing the terminal moves during a period of time;

cause the camera to turn on and cause the display to display a graphic object indicating that the camera is in operation and that information related to an object is being collected when a gaze direction of the user sensed by the sensor is not changed for a reference period, wherein the information related to the object comprises a representative image of the object captured by the camera and attribute information associated with the object, and wherein the attribute information comprises at least a time and a location at which the representative image is captured and a duration of a gaze directed to the object which results in the representative image, cause storing of the representative image of the object and the attribute information related to the object in the memory, wherein the memory further stores a plurality of representative images of a plurality of objects captured while the user wearing the terminal moves through the path and a plurality of attribute information of the plurality of objects associated with the plurality of objects; and cause the display to display at least one of the plurality of representative images in response to a user input comprising a keyword designating the path and one of the attribute information.

4. The terminal of claim 3, wherein:

the controller is further configured to recognize text information present in the information related to the object; and the attribute information further comprises the recognized text information.

5. The terminal of claim 3, further comprising a location information unit configured to identify a current location of the terminal, wherein:

the controller is further configured to obtain location information based on the identified current location; and the obtained location information is associated with a place at which the object is present.

6. The terminal of claim 3, wherein:

the sensor is further configured to sense at least multiple taps that are applied to a portion of the terminal, a predefined gesture input by a user, or an electromyogram change in facial muscles of the user as the user input; and the controller is further configured to recognize the user input sensed by the sensor.

7. The terminal of claim 6, wherein the controller is further configured to initiate or terminate obtaining of the information related to the object in response to the recognized user input.

8. The terminal of claim 3, further comprising:

a location information unit configured to obtain location information including a current location of the terminal, wherein the controller is further configured to cause the display to display information related to the current location and additional information related to a specific location among the obtained location information in response to selection of the specific location from the obtained location information.

9. The terminal of claim 3, wherein the controller is further configured to:

recognize the obtained information related to the object as parking information comprising a location at which a vehicle is parked; and cause the display to display at least a portion of the parking information among a plurality of portions included in the parking information in response to the user input.

10. The terminal of claim 9, wherein the controller is further configured to:

determine whether the user is out of the vehicle based on at least a change in a moving speed of the terminal or a change in a distance between the terminal and a location of the vehicle; and recognize the parking information based on whether the user is out of the vehicle.

11. The terminal of claim 9, wherein the camera is configured to capture visual information of the location at which the vehicle is parked, and wherein the controller is further configured to:

match the captured visual information with at least one of a plurality of pre-stored parking information; and cause the display to display the matched at least one pre-stored parking information distinguishably from other pre-stored parking information among the plurality of pre-stored parking information.

12. The terminal of claim 11, wherein the controller is further configured to initiate or terminate an operation of the camera in response to at least multiple taps that are applied to a portion of the terminal, a predetermined gesture input by the user, or an electromyogram change in facial muscles of the user.

13. The terminal of claim 9, wherein the controller is further configured to:

cause the display to display the information related to the path in addition to the parking information in response to the user input.

14. The terminal of claim 13, wherein the controller is further configured to cause the display to display the path as a graphic object rendered in augmented reality.

* * * * *